(12) United States Patent
Pérez De Aranda Alonso et al.

(10) Patent No.: US 9,094,151 B2
(45) Date of Patent: Jul. 28, 2015

(54) FRAME STRUCTURE FOR ADAPTIVE DATA COMMUNICATIONS OVER A PLASTIC OPTICAL FIBRE

(71) Applicant: Knowledge Development for POF, S.L., Madrid (ES)

(72) Inventors: Rúben Pérez De Aranda Alonso, Madrid (ES); Pedro Reviriego Vasallo, Madrid (ES); Dunia Prieto Francia, Madrid (ES); David Ortiz Rojo, Madrid (ES)

(73) Assignee: Knowledge Development For POF, S.L., Madrid (ES)

( * ) Notice: Subject to any disclaimer, the term of this patent is extended or adjusted under 35 U.S.C. 154(b) by 197 days.

(21) Appl. No.: 13/856,680

(22) Filed: Apr. 4, 2013

(65) Prior Publication Data

US 2013/0330082 A1    Dec. 12, 2013

(30) Foreign Application Priority Data

Jun. 8, 2012  (EP) ..................... 12171346

(51) Int. Cl.
*H04J 3/06*   (2006.01)
*H04J 14/08*  (2006.01)
*H04B 10/25*  (2013.01)

(52) U.S. Cl.
CPC ............... *H04J 14/08* (2013.01); *H04B 10/25* (2013.01)

(58) Field of Classification Search
USPC ............................................. 375/354; 398/98
See application file for complete search history.

(56) References Cited

U.S. PATENT DOCUMENTS

| | | | |
|---|---|---|---|
| 6,382,824 B1 * | 5/2002 | Prasad et al. | 362/551 |
| 7,496,132 B2 * | 2/2009 | Song | 375/149 |
| 2004/0114592 A1 | 6/2004 | Kang et al. | |
| 2010/0188972 A1 | 7/2010 | Knapp | |

FOREIGN PATENT DOCUMENTS

| | | |
|---|---|---|
| JP | S61-186039 | 8/1986 |
| JP | H11-186993 | 7/1999 |

(Continued)

OTHER PUBLICATIONS

Perez-Aranda R et al., "Achieving low cost gigabit connectivity using POF", 36th European Conference and Exhibition on Optical Communication: (ECOC 2010); Torino, Italy, Sep. 19-23, 2010, IEEE, Piscataway, NJ, USA, Sep. 19, 2010, pp. 1-8, XP031789624, ISBN: 978-1-4244-8536-9, pp. 2, 14, 15.

(Continued)

*Primary Examiner* — Duc C Ho
(74) *Attorney, Agent, or Firm* — Plumsea Law Group, LLC

(57) ABSTRACT

The present invention relates to transmission and reception of data over a plastic optical fiber. In particular, the present invention provides for transmission and reception over the plastic optical fiber a particularly suitable frame structure. The frame structure includes a synchronization sequence and portions of user data alternating with alternating reference signal portions and control data portions. The length of the user data portions may be equal, the length of the synchronization sequence and the control data and reference signal portions may also be equal. The distances between the synchronization sequence and the reference signal portions and the control data portions are advantageously equal. The alternating of data and additional information avoids data decoding latency while maintaining the rate necessary for the additional information.

20 Claims, 17 Drawing Sheets

(56) References Cited

FOREIGN PATENT DOCUMENTS

| JP | 2008-103959 | 5/2008 |
| JP | 2011-504005 | 1/2011 |

OTHER PUBLICATIONS

Sewon Lee et al, "Implementation of MOST/CAN network protocol", Electrical and Control Engineering (ICECE), 2011 International Conference ON, IEEE, Sep. 16, 2011, pp. 5974-5977, XP031959951, DOI: 10.1109/ICECENG.2011.6057339, ISBN: 978-1-4244-8162-0, p. 5974-5975.

European Search Report dated Oct. 30, 2012 in European Patent Application No. 12171346.5-2415.

Office Action mailed May 29, 2014 in Korean Patent Application No. 10-2013-0065447.

Office Action mailed May 20, 2014 in Japanese Patent Application No. 2013-120838.

\* cited by examiner

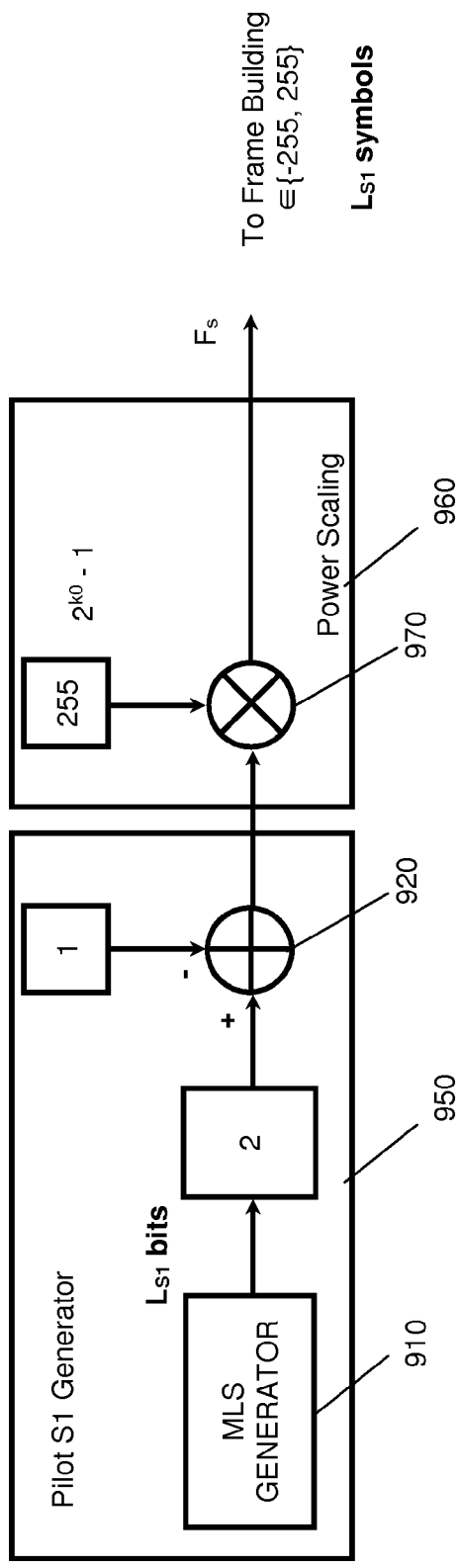
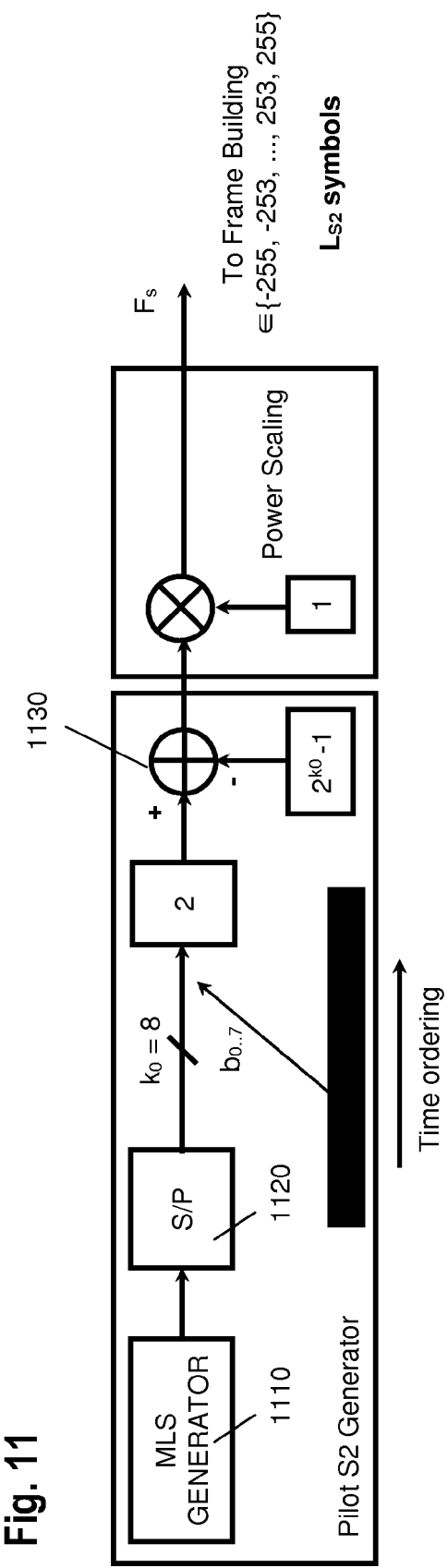
Fig. 9
Fig. 11

PHS Power Scaling

| k | M-PAM | $SF_{thp}(k)$ THP enabled | $SF_{full}(k)$ THP disabled |
|---|---|---|---|
| 1 | 2 | 128 | 255 |
| 1,5 | 4 | 64 | 85 |
| 2 | 4 | 64 | 85 |
| 2,5 | 8 | 32 | 36 |
| 3 | 8 | 32 | 36 |
| 3,5 | 16 | 16 | 17 |
| 4 | 16 | 16 | 17 |
| 4,5 | 32 | 8 | 8 |
| 5 | 32 | 8 | 8 |
| 5,5 | 64 | 4 | 4 |
| 6 | 64 | 4 | 4 |
| 6,5 | 128 | 2 | 2 |
| 7 | 128 | 2 | 2 |
| 7,5 | 256 | 1 | 1 |
| 8 | 256 | 1 | 1 |

Fig. 18A

FRAME STRUCTURE FOR ADAPTIVE DATA COMMUNICATIONS OVER A PLASTIC OPTICAL FIBRE

The present invention relates to a transmission of data over a plastic optical fibre. In particular, the present invention relates to a method and an apparatus for transmitting and receiving data over a plastic optical fibre using a particular frame structure.

BACKGROUND OF THE INVENTION

Today's communications systems utilize various types of cable and radio interfaces. The most reliable are glass optical fibres which also enable very high transmission rates. On the other hands, copper cables still form part of the telephone lines which are also used for transmission of data. Especially in the last decades, wireless communications has developed rapidly. All these data transport media have their own characteristics and are suitable for deployment in different scenarios and architectures.

Glass optical fibres (GOF) are used nowadays especially for communication requiring a very high bandwidth and very low attenuation. Since glass optical fibres have very small diameters and low numerical apertures (NA) its installation requires special and expensive connector tools and skilled installation workers.

Another possibility is the deployment of plastic optical fibres (POF), for instance, based on poly-methyl-methacrylate (PMMA) with a larger core diameter (about 1 mm) and a high numerical aperture (NA of approximately 0.3 to 0.5). The least expensive and most used plastic optical fibre is an SI-POF with a numerical aperture of 0.5. However, there is also an SI-POF with a low numerical aperture of 0.3 enabling higher data rates as well as PMMA GI-POF with a bandwidth length product near to 1 GHz×100 meter. PMMA has several attenuation windows that enable POF to be used with different visible light sources from blue to red Light Emitting Diodes (LED) or red Lasers Diodes (LD).

In comparison with GOF, plastic optical fibres have an advantage of a very easy installation. They can be deployed by professional or non-professional installation workers using basic tools such as scissors or cutters and inexpensive plastic connectors. It is resilient to misalignment and strong vibrations so it can be installed in industrial and automotive environments without loss of communication capacity. The POF connections have also much higher tolerance to residual dust on the terminal faces than GOF, due to the larger core diameter.

Since the transmission over POF is optic, plastic optical fibres are completely immune to electrical noise. Thus, the existing copper wiring will not interfere with data passing through plastic optical fibres so it can even be installed next to electrical cabling. Plastic optical fibre connectors and optoelectronics for POF are mainly low cost consumer parts which enable installation workers to save cable costs and installation, testing, and maintenance time. Plastic optical fibres have been widely employed, in particular, for infotainment networks in cars and can now be seen as a global standard for high-speed on-board car networks such as Media Oriented Systems Transport (MOST).

FIG. 1 illustrates an example of a system for transmission and reception of data over POF. The transmission over plastic optical fibres is based on a light intensity modulation with direct detection. The signal to be transmitted is generated from a digital circuit 110 for encoding and modulating the user bit stream information and passed to a transmitter (Tx) analogue front end (AFE) 120 for conversion of digital data into an electrical signal for controlling the light emitting element 130. After this conversion of the electric signal to an optical signal, the latter is then input to the optical fibre 150. Electrical optical converters used for plastic optical fibres are typically light-emitting diodes (LED) characterized by properties such as a peak wavelength, a wavelength width or launching modal distribution. The LED response in terms of electrical to optical conversion is non-linear. Therefore, the LED introduces harmonic distortion in the form of dynamic compression over the communication signal. Furthermore, the non-linear response has a high dependency with the temperature.

During the transmission of the signal via plastic optical fibres 150, the light is affected by severe attenuation as well as distortion mainly due to modal dispersion. The modal dispersion is caused by different modes of light propagating in the fibre on different paths and with different speeds and attenuations, resulting in different arrival times at the receiver. The optical signal is also affected by a so-called mode coupling where the energy of higher order modes is transferred to lower order modes and vice versa. As a consequence, an optical pulse is broadened which leads to lower the signal bandwidth.

At a receiver, the optical signal from the plastic optical fibre 150 is converted into electrical intensity by means of an opto-electric converter 170 such as a photodiode. Then, the electrical signal is processed by the analogue front end (AFE) 180. In particular, it is amplified, inter alia by a trans-impedance amplifier (TIA) and connected to a digital receiver 190. The TIA is typically the most important noise source which limits the final sensitivity of the communication system. Because POF presents a high attenuation factor with the length, the photodiode and TIA must be designed to be able to work with a very high range of optical power input, with limited voltage supply. This is allowed by implementing Automatic Gain Control (AGC) that controls the trans-impedance as a function of the photodiode average current. Several parameters, as harmonic distortion, bandwidth and delay group, as well as the input referred noise and flicker noise of the TIA depends on the variable trans-impedance, therefore the digital receiver must be able to track all these variable parameters in order to optimally decode the communication data.

Regarding the data transmission technology, GOF have been successfully using a non-return-to-zero (NRZ) modulation. In particular, current glass fibre communication systems mainly utilize NRZ 8b/10b or NRZI 4b/5b line coding which requires a baud rate of 1.25 GHz and 125 MHz for 1 Gbps and 100 Mbps solutions, respectively. Current plastic optical fibre solutions thus also adopted NRZ modulation for data communications. However, plastic optical fibres have a frequency and time response different from that of glass fibres and also have considerably higher attenuation. As a communication medium, plastic optical fibres show a very high modal dispersion due to its important differential mode delay and differential mode attenuation. The large area photodiodes required for coupling with a fibre typically have a limited bandwidth. In view of a plastic optical fibre frequency response, solutions supporting 100 or 150 Mbps are possible up to ca. 30 meters with enough link budget for installation; but 1 Gbps does not seem to be achievable without a more advanced technology.

FIG. 2A shows a variation of POF optical bandwidth (y axis, in MHz) as a function of the fibre length (x axis, in meters). FIG. 2B shows the variation of the bandwidth-length product (y axis, in MHz·100 m) as a function of the fibre length. Here, the fibre is an SI-POF with a numerical aperture NA of 0.5 (in particular, model Mitsubishi Eska-GH4001), and the light source is an RCLED with launching condition FWHN NA of 0.31, wavelength peak of 658 nanometers and an FWHN wavelength width of 21 nanometers. As can be seen from FIG. 1, a suitable flat response for a desired 1.25 GHz baud rate is only possible in the very first meters of the plastic optical fibre. For a laser light source, the optical bandwidth as a function of length is very similar. Therefore, the bandwidth bottleneck is produced by plastic optical fibres independently on how fast the light source is because the limiting factor is, in particular, the modal dispersion by mode coupling in the fibre.

As can be seen from the above described characteristics of the plastic optical fibre and the opto-electronics, its temperature and time-variant non-linear characteristics pose several challenges for optimization of data transmission over this medium. Techniques such as Tomlinson Harashima Precoding, adaptive equalization, adaptive coding and modulation help improving the transmission. However in order to efficiently employ them, additional information is to be transmitted with the data over the plastic optical fibre.

Standard IEEE 802.3u is known as fast Ethernet. Fast Ethernet may be transmitted according to 100BASE-FX over optical fibre, which may be a single-mode fibre (SMF) or a multi-mode fibre (MMF). Fast Ethernet provides transmission with rate of 100 Mbps at physical layer. It employs PCS and PMA (cf. IEEE 802.3 Clause 24, PMD: IEEE 802.3 Clause 26). 100BASE-FX does not provide a physical frame structure which would enable transmitting signals necessary for adaptive equalization, coding and modulation. The physical layer is based on the line block code 4b5b with NRZI (non return to zero inverted) modulation. The 4b5b code is a run-length limited code which maps groups of four bits onto groups of five bits. The 5-bit output words are predetermined in a dictionary and chosen to ensure presence of at least two transitions per block of 5 bits. The NRZI modulation codes binary 1 with a transition and binary 0 with no transition of a signal. The combination of NRZI and 4b5b provide a enough number of clock transitions per time, making easier the clock recovery. Free codes from the 4b5b coding are used for fail and collision signaling between the link partners. The bit runtime is further limited, so that the DC unbalancing is constrained. Moreover, the NRZI coding produces high frequency pre-emphasis, which aids to counteract the low pass response of the communication channel. The 4b5b line coding results in 25% extra required bandwidth.

Another standard is IEEE 802.3z (1000BASE-X), which provides 1 Gbps Ethernet over optical fibers (both SMF and MMF). Similarly as above, PCS and PMA are used (cf. IEEE 802.3 Clause 36, PMDs: Clause 38, for long (1000BASE-LX) and short waves (1000BASE-SX) lasers). It does not provide a frame structure for advanced modulation and equalization techniques. This standard employs 8b10b line coding with NRZ modulation. The 8b10b coding provides good DC balance and the limited run-time that makes easier the clock recovery in the receiver. Free codes from the 8b10b coding are used for signaling, carrier sensing, collision detection etc. However, a 25% extra bandwidth is required due to the line coding. Use of this standard for 1 Gbps over POF provides a very limited performance, being only possible in very short fiber (a few meters).

The standards used for fast transmission of signals over other media such as IEEE 802.3ab, 1000BASE-T (1 Gbps Ethernet over 4 twisted copper pairs Class D with nominal impedance 100 ohm IEC 11801:1995) are not suitable for plastic optical fibre since the plastic optical fibre has substantially different characteristics, although they may include a frame and differentiated symbols for training and normal data transmission. The plastic optical fibre is a medium on which optoelectronics typically presents even and odd orders harmonic distortions due to submicron technology limitations. In general, LED is a low-cost light source, with limited bandwidth and high non-linearity in the electrical current to optical power conversion. POF is linear for the typical injected power, which is limited due to eye safety constraints. Photodiode and Trans-Impedance Amplifier are highly dependent in bandwidth and noise on the gain. They must work in a very wide dynamic range (short and long fibers), so there are technological limits to provide a linear response. Typically there will be odd order harmonic distortion produced by these devices that require compensation. Additionally, the harmonic distortion in optoelectronics devices has a great dependence with temperature. This imposes the requirement of continuous tracking of the non-linear channel response.

SUMMARY OF THE INVENTION

In view of the above-mentioned features of plastic optical fibre, the aim of the present invention is to provide an efficient communication frame structure for adaptive transmission system based on plastic optical fibres.

This is achieved by the features of the independent claims.

Further advantageous embodiments are put forward in the dependent claims.

It is a particular approach of the present invention to provide a frame structure starting with a synchronization sequence and in which the user data regularly alternates with additional signal, namely with reference signal and control information.

In accordance with an aspect of the present invention a method is provided for transmitting user data over a plastic optical fibre. The method includes the following steps: generating a synchronization sequence, a reference signal and a control signal; forming a frame a frame starting with the generated synchronization sequence and including a plurality of portions for transmitting the user data, a plurality of portions of the reference signal, and a plurality of portions of the control data, wherein a portion for transmitting the user data is located between each two of the synchronization sequence, a portion of the reference signal and a portion of the control data, and transmitting the generated frame over a plastic optical fibre.

In accordance with another aspect of the present invention, a method is provided for receiving used data over a plastic optical fibre. The method includes the steps: receiving over a plastic optical fibre signal; detecting in the received signal a synchronization sequence indicating start of a frame; extracting from the frame a plurality of portions of a reference signal and control data, wherein a portion for transmitting the user data is located between each two of the synchronization sequence, a portion of the reference signal and a portion of the control data.

If the user data have been transmitted, the method further includes a step of extracting and decoding the user data based on extracted reference signals and control data.

In accordance with another aspect of the present invention, an apparatus is provided for transmitting user data over a plastic optical fibre. The apparatus includes a generator for generating a synchronization sequence, a reference signal and a control signal; a frame assembler for forming a frame a frame starting with the generated synchronization sequence and including a plurality of portions for transmitting the user data, a plurality of portions of the reference signal, and a plurality of portions of the control data, wherein a portion for transmitting the user data is located between each two of the synchronization sequence, a portion of the reference signal and a portion of the control data, and a transmitter for transmitting the frame over a plastic optical fibre.

In accordance with another aspect of the present invention, an apparatus is provided for receiving used data over a plastic optical fibre. The apparatus includes a receiver for receiving over a plastic optical fibre signal; a synchronizer for detecting in the received signal a synchronization sequence indicating start of a frame; a signal detector for extracting from the frame a plurality of portions of a reference signal, wherein a portion for receiving the user data is located between each two of the synchronization sequence, a portion of the reference signal and a portion of the control data.

In case the user data have been transmitted a data decoder included in the apparatus may be adapted to extract and decode the user data based on extracted reference signals and control data.

It is noted that the portion for transmitting the user data may but does not necessarily include the actual user data. This is given by the availability of the user data. For instance, in low power modus, the user data are not transmitted.

The alternating of user data portions, reference signal portions and control information provide the advantage of avoiding latency in data transmission at the transmitter and correspondingly data reception and decoding at the receiver. At the same time, more additional information can be transmitted in the plurality of portions, enabling employment of adaptive equalization and coding and modulation techniques.

Employing plastic optical fibre provides many advantages. In particular, with respect to wireless and electric transmission media, POF are resilient against electro-magnetic interference. In comparison with glass optical fibre, POF enables easier installation, is less expensive and provide higher robustness with respect to connections. The present invention exploits the advantages of POF and provides an adaptive system which enables a high data-rate communication over POF.

The plastic optical fibre here is any commercially available optical fibre made of plastics. The present invention relates to a digital processing to be performed at the transmitter before the signal is converted to analogue values to control a light emitting element for generating the optical signal injected into POF and/or at the receiver after the optical signal has been detected by a photo-electric element.

Advantageously, the distance in terms of frame timing between each two of the synchronization sequence, a portion of the reference signal and a portion of the control data is equal. This provides the advantage of a regular frame structure which is particularly beneficial for timing recovery and also for a low-power modus according to an embodiment of the present invention described below.

Alternatively or in addition, preferably the length in terms of frame timing of the synchronization sequence, a portion of the reference signal and a portion of the control data is equal. This also contributes to a regularity of frame and an easier implementation. The frame timing here may be the symbol timing (symbol rate) as contrast to the number of bits which depends on the employed modulation and may differ within the frame and between different frames.

Preferably, between each two portions of the reference signal there is a portion of the control data. This supports the distributed reference signal and control information structure.

In accordance with an embodiment of the present invention, a low-power mode is provided, in which the intervals designated for data transmission may be transmitted with almost no power or no power when no user data is available. In particular, in the low-power mode, the method for transmitting the data over POF may include a step of low-power transmission including transmitting with substantially no power within the user data portions of the frame, while still transmitting the synchronization sequence, the reference signal and the control information with a predetermined non-zero power. Correspondingly, in the low-power mode, the method for receiving the data over POF may include a step of low-power reception including respectively receiving substantially no power within the user data portions of the frame, and receiving the synchronization sequence, the reference signal and the control information with a non-zero power.

The low-power mode provides a great power saving since in the case when no data is available for the transmission, no transmission is performed. The saving is also provided at the receiver side since the receiver does not have to perform reception during the data intervals if not necessary. The term "substantially" no power refers to the fact that still some remaining power may be present in a portion of the user data portion. For instance, for the transmission into the sleep modus and waking up from the sleep modus after or before the transmission of the additional information portion, turning down and up the power may take some time.

Advantageously, the application of low-power mode transmission and/or reception may be indicated within the control information. The signaling may be performed within the header distributed in chunks in the entire frame and may apply for the next frame or frames. Alternatively, the control information may signal the application of the low-power mode (transmission of no data without power) for the following user data portions until the signaling to the contrary is received. However, the present invention is not limited thereby and the signaling may also be performed in any other way, or not implemented. For instance, the receiver may detect whether optical power is transmitted in a number of symbols at all and if not, it may switch the reception off for the "sleep" period(s).

Preferably, the synchronization sequence is a predefined sequence of symbols modulated by a 2-level pulse-amplitude modulation. This enables a robust transmission of the synchronization sequence and its detection with low complexity.

The synchronization sequence and/or each reference signal portion and/or each control data portion starts and ends with a zero-signal of a predefined length. This zero signal portion serves for avoiding the inter-symbol interference. When the synchronization sequence and the portions of reference signal and control data are separated from each other always with the user data portions, the user data portions do not need any further zero-signal separation. Advantageously, the length of the zero signal is adapted to accommodate the essential parts of the channel taps (response).

Preferably, the reference signal is a sequence of predetermined symbols modulated by an M-level pulse-amplitude modulation with M being an integer larger than 2. Employing higher-level modulation in a reference signal enables a finer channel characteristics estimation and a better equalization adaptation. This is beneficial for non-linear channel estimation and equalization. The non-linear channel estimation and equalization enables rate increasing of transmission over POF, which has rather non-linear characteristics.

Advantageously, the control data is modulated by a 2-level pulse-amplitude modulation, coded with a forward error correction coding and included a cyclic redundancy check. This ensures that the control data are robustly transmitted and decoded correctly with higher probability than the user data.

Preferably, the transmission method further comprises a step of Tomlinson-Harashima precoding applied to the modulated symbols. However, other equalization approaches are also possible for the present invention. For instance, instead of precoding, a Feed-Forward Equalizer may be applied at the receiver. This may be more suitable for systems, in which a feedback channel from the receiver to the transmitter is difficult to implement. It is noted that these are only examples and the present invention may work also with any other equalization techniques.

Advantageously, the Tomlinson-Harashima precoding is applied to the user data portions but not to the control data portions and reference signal portions. This is enabled in particular by providing the zero signal at the beginning and/or end of the synchronization, reference and control portions.

Preferably, prior to transmission, the signal is scaled to ensure that the OMA is approximately the same across the entire frame. Parameter k0 may be configurable. The scaling factor may, for instance, depend on the number of PAM levels used and on whether or not THP is active. Advantageously, constellations of all the frame parts are normalized to an arbitrary range $[-2^{k0}, 2^{k0}]$ after scaling, wherein k0 is the maximum PAM order supported by the corresponding (to be scaled) data portions. The scaling factor may thus differ for the synchronization, reference, control, and payload data. In accordance with a preferred embodiment of the present invention, an integrated circuit is provided, implementing any of the above described approaches.

Advantageously, a system is provided for transmitting digital data over plastic optical fibre. The system comprises a transmitter as described above for embedding the user data and the additional information into a frame structure, electro-optic converter for converting the coded signal into optical signal and for injecting the optical signal into the POF, an opto-electric detection element for transforming an optical signal received from the POF to an electric signal, and a receiver as described above for extracting user data from the frame structure and decoding them.

BRIEF DESCRIPTION OF THE DRAWINGS

The above and other objects and features of the present invention will become more apparent from the following description and preferred embodiment given in conjunction with the accompanying drawings in which:

FIG. 9 is a block diagram illustrating an example of a synchronization sequence generator;

FIG. 10 is a schematic drawing illustrating a signal corresponding to the generated synchronization sequence;

FIG. 11 is a block diagram illustrating an example of a reference signal generator;

FIG. 18A is a table illustrating an example of power scaling parameters for different transmission configurations, in user data portions;

DETAILED DESCRIPTION

Figure 1:
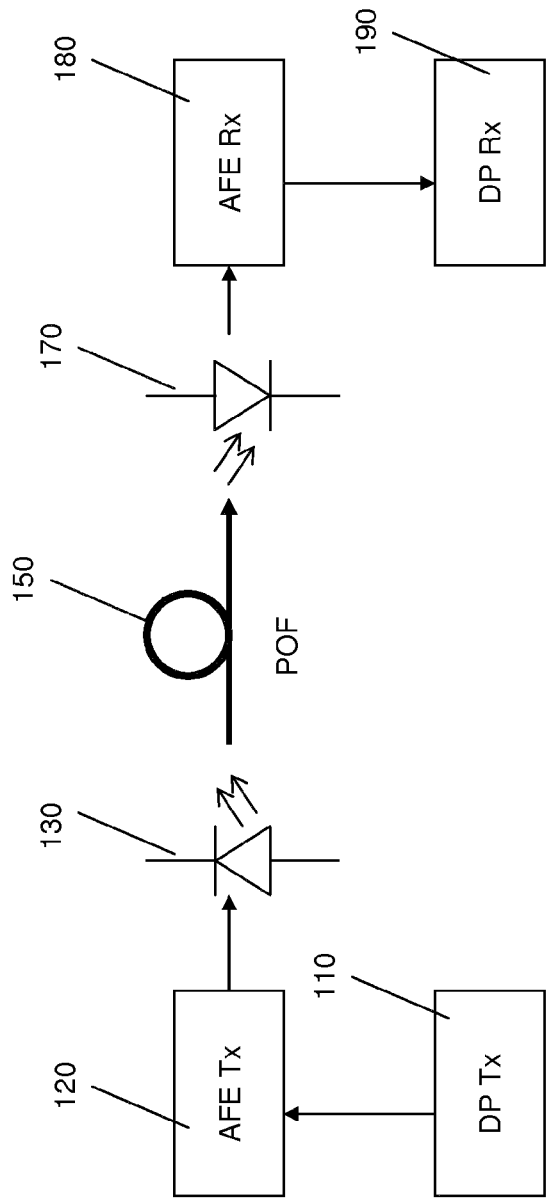
FIG. 1 is a schematic drawing illustrating an example of a system for transmission and reception of data over POF.

The problem underlying the present invention is based on an observation that techniques typically used for optical glass fibre are not sufficient to achieve an efficient transmission of data over a plastic optical fibre. Due to a difference between characteristics of plastic optical fibre channels compared to glass optical fibres, wireless or copper channels, the techniques developed and employed for such channels are also not directly applicable to plastic optical fibres. It is one of the aims of the present invention to enable a highly spectrally-efficient data communications over POF.

One of the general criteria for designing a communications system is maximizing the capacity of the channel. Channel capacity bound can be calculated in accordance with the information theory using the Shannon limit on rate defined as maximum mutual information of a random variable at the input and the output of the channel. However, in practice it is difficult to achieve such theoretical bounds. This is caused inter alia by the real elements employed, which in general do not have ideal characteristics. Another important factor when designing a communications system is its efficiency in terms of implementation complexity, which has direct impact on the costs and feasibility of the product as well as on its latency.

When designing a communication system employing plastic optical fibres it is therefore necessary to consider limitations of both electrical and optical elements necessary for signal processing. Considering all the elements affecting the transmitted signal such as current driver, light-emitting elements, POF itself, photodiodes, trans-impedance amplifiers, etc., the communication channel is to be considered as non-linear. The main source of non-linearity is the characteristics of the conversion of electrical intensity into optical power of the LED. On the other hand, plastic optical fibres are power peak limited communication channels. This feature makes POF different from other types of channels used for communications such as copper or wireless channels in which the transmission signal is constrained to fulfil a given power spectral density and/or average power. The peak limit is caused by the fact that the optical signal cannot be negative and that the electrical intensity is limited in light emitters such as LED or laser diode in order to extend the life of the device.

Typically, the communications systems are designed by looking for a trade-off between the bandwidth and the signal-to-noise ratio (SNR). The aim of the optimization is to achieve the capacity bounds known from theory. Key digital techniques having impact on approaching of the capacity limit are modulation, compensation of the inter-symbol interference, coding and frame structure. These techniques have to be designed with regard to the characteristics of the communication channel and possibly with regard to each other. In particular, employment of an adaptive modulation and coding as well as adaptive equalization may improve the efficiency of the system.

Crest factor (also called peak-to-average ratio) is a ratio of a peak amplitude of the waveform divided by root mean square of the waveform. For optical systems, a modulation is appropriate which minimizes the crest factor and maximizes the variance of the optical signal for a given optical modulation amplitude (OMA) injected to the POF. Modulation techniques that enable this are the M-ary pulse amplitude modulation (M-PAM) and the difference M-PAM. Pulse amplitude modulation assigns to each of M levels a particular signal height (signal amplitude). Assuming a zero-mean constellation before electro-optic conversion, the crest factor is minimized and the average energy of the symbol is minimum for a given constellation minimum distance, since several levels of the signal are uniformly distributed. The number of levels of the pulse amplitude modulation may be defined as a function of the bandwidth, required bit rate, and/or coding. In order to design modulation appropriately, a link power budget of the plastic optical fibre channel has to be analyzed. For maximizing the link power budget, there exists an optimum value for the number of levels and the signal bandwidth for a desired transmission rate as will be shown later. A high spectral efficiency communications system is necessary in order to maximize the link power budget. Based on this requirement, equalization, channel coding and modulation have to be designed with regard to channel and an appropriate frame structure is necessary to efficiently transmit the data and the required additional information.

As a consequence of signal broadening in the transmission medium, here POF, the neighbouring data carrying symbols overlap when received, which makes it difficult to detect and decode them correctly. This effect is called inter-symbol interference. In order to recover such symbols, equalization techniques are typically employed. There are many equalization approaches at the receiver side available in the prior art including MMSE equalizer, zero-forcing, feed-forward equalizer, decision-feedback equalizer, etc.

In order to efficiently design a communication system, based on Volterra models which may be obtained for particular channel by means of analysing its measured characteristics, the linear and non-linear parts of the channel characteristics may be separated. For the linear part of the channel, link power budget maximization in accordance with information theory may be performed. Moreover, the equalization may be designed independently for the linear and the non-linear part of the channel. At the transmitter and/or the receiver side, a linearizer (a non-linear filter structure) may be employed to provide a far enough linear channel where the well known equalization techniques may be used.

For instance, a Feed-Forward Equalization (FFE) is an equalization technique employed at the receiver that corrects the received waveform based on information about the waveform itself, in particular about the current waveform and waveform associated with the previously received communication symbols. The equalization is performed on the waveform (voltage levels) before any decisions on the received bits are met. Another well-known technique is Decision Feedback Equalization (DFE). DFE calculates a correction value that adapts decision thresholds for detecting multi-dimensional modulation symbols. Thus, DFE results in shifting the threshold based on which new decisions are made (more details on DFE and equalization can be found in J. G. Proakis, *Digital Communications*, 4$^{th}$ *Edition*, McGraw-Hill Book Co., New York, 2001, incorporated herein by reference). A drawback of the DFE is error propagation, resulting from decision errors at the output of the decision device which cause incorrect estimation of the postcursor Inter-Symbol Interference (ISI). The error propagation can be avoided by using transmitter precoding.

Precoding enables moving the cancellation of the postcursor ISI to the transmitter where the data symbols are available. Moreover, a feed-back filter is employed to precode the signal using a current channel impulse response. The impulse response is typically estimated at the receiver using adaptive filter techniques and fed back to the transmitter. There are several different variations of precoders (cf., for instance, G. D. Formey and G. Ungerboeck "*Modulation and coding for linear Gaussian channels*", *IEEE Trans. on Information Theory*, vol. 44, no. 6, October 1998, pp. 2384-2415, which is incorporated herein by reference). One of the precoding techniques, namely Tomlinson-Harashima precoder (THP), is of particular interest. The Tomlinson-Harashima precoding (for more details see, for instance, R. D. Wessel, J. M. Cioffi, "*Achievable rates for Tomlinson-Harashima Precoding*", *IEEE Trans. on Inf. Theory*, vol. 44, no. 2, March 1998, pp. 824-831, which is also incorporated herein by reference) is considered as a prominent precoding scheme especially due to its capability to efficiently cancel out the known interference at the transmitter side. Therefore, the information rates achieved by THP are superior to those achieved by conventional linear precoding schemes.

Figure 3A:
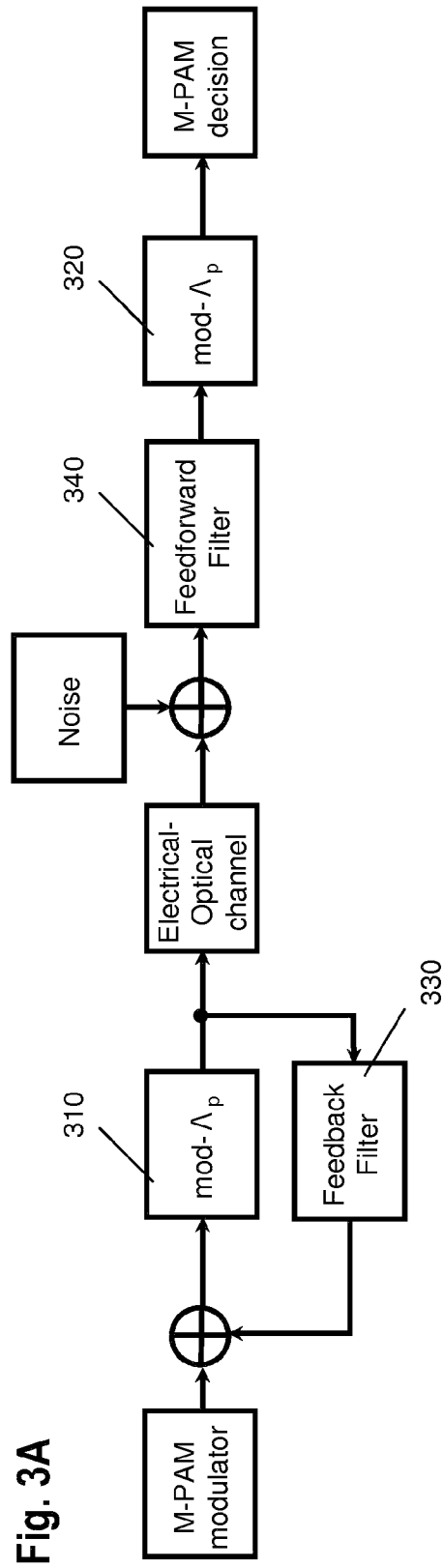
FIG. 3A is a block diagram illustrating the functionality of Tomlinson-Harashima precoding.
Figure 2A:
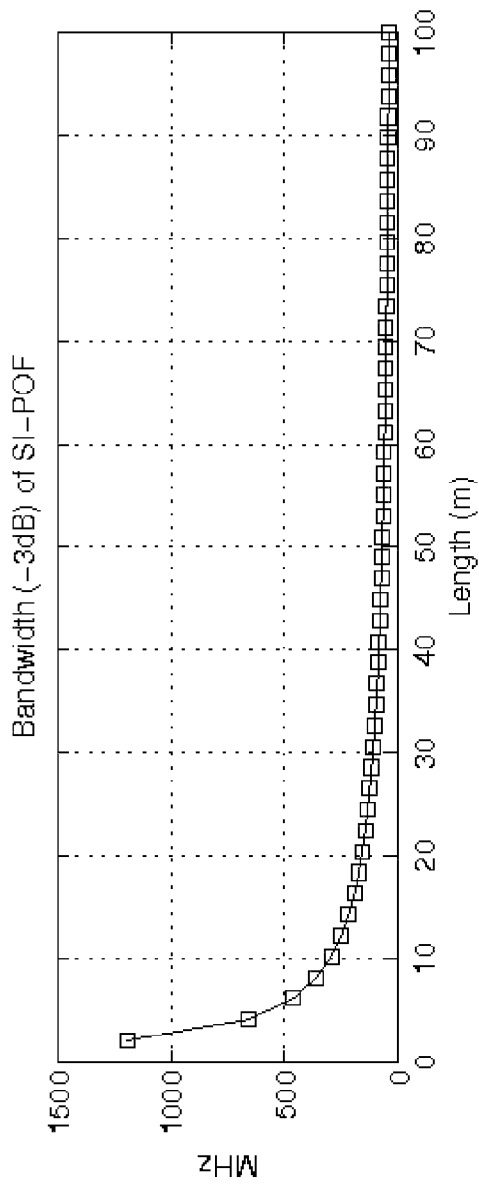
FIG. 2A is a graph illustrating an optical bandwidth of a plastic optical fibre as a function of its length.
Figure 2B:
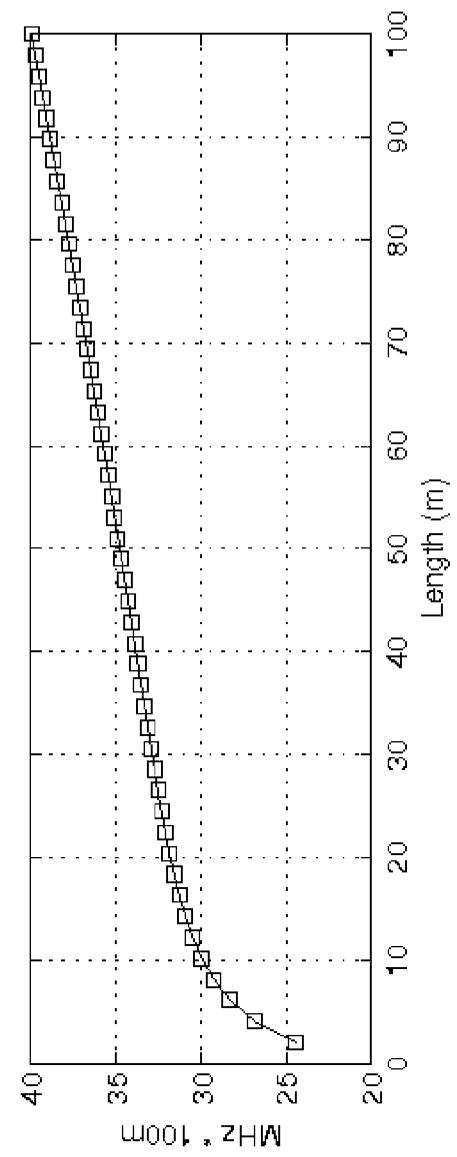
FIG. 2B is a graph illustrating a product between optical bandwidth and length as a function of length.
Figure 3B:
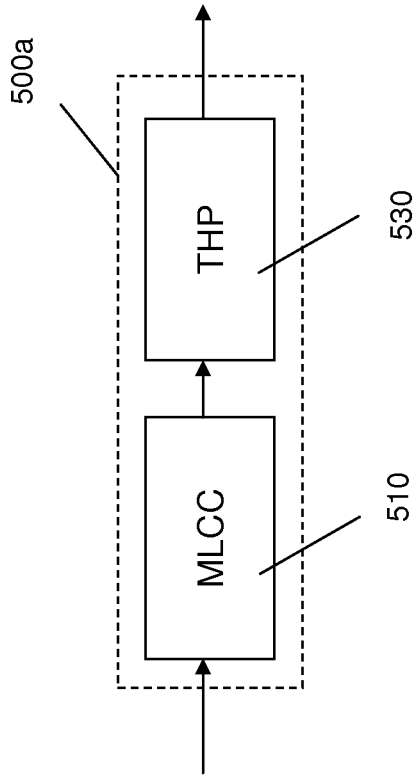
FIG. 3B is a block diagram illustrating functional blocks of the coding and modulation advantageously applied for transmission over POF.
Figure 3C:
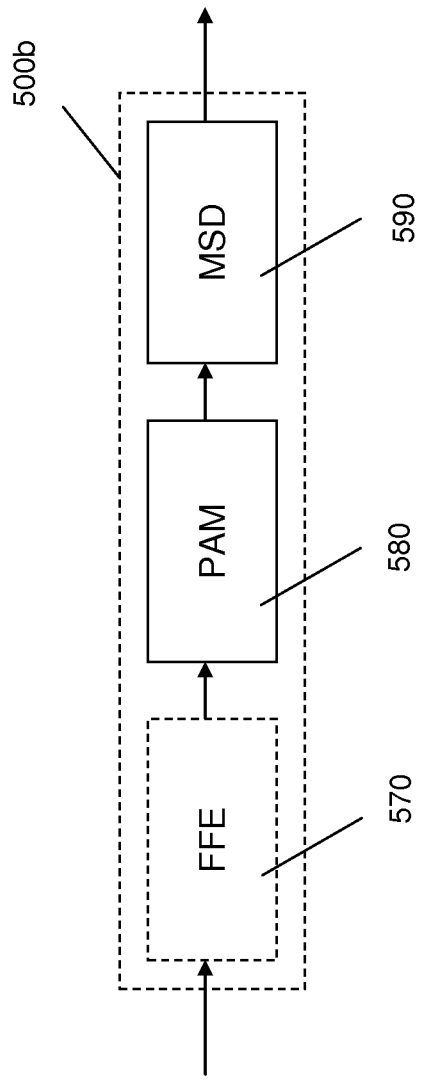
FIG. 3C is a block diagram illustrating functional blocks of the decoding advantageously applied for transmission over POF.

FIG. 3 illustrates a known employment of THP with an M-PAM modulation. The Tomlinson-Harashima precoder moves the feedback filter 330 of a DFE structure to the transmitter and combines it with a modulo operator 310 in order to reduce the post-cursor ISI compensated symbols to the precoding Voronoi region of the corresponding M-PAM constellation. The feed-forward filter 340 remains at the receiver to compensate the cursor and pre-cursor ISI and to whiten the noise. Then, a modulo operator 320 analogous to the transmitter-side modulo operator 310 is needed to recover the transmitted symbols. The THP is capable of approaching the performance of the ideal DFE without error propagation, for middle and high spectrally efficient modulations.

However, THP equalization presents four inherent capacity losses precoding loss, crest-factor loss, modulo loss, and shaping loss, from which only the first two are relevant for the aimed application to POF. These losses are mainly caused by the application of the modulo operator and depend on the number of modulation levels as shown below.

The modulo operator together with the feedback filter at the transmitter converts a discrete uniform distribution of M-PAM symbols into a continuous uniform distribution extending to the full Voronoi region of the original constellation (assuming that the energy dispersion of the feedback filter is large enough to completely fill the Voronoi region corresponding to precoding). This results in an increase of transmission signal energy, which needs to be compensated by the transmitter in order to input the same average power to the POF. Therefore, the energy increase leads at the receiver to a loss of the available SNR, which is called precoding loss. The precoding loss can be estimated as a function of number of modulation levels M as:

$$\xi(dB) = 20 \cdot \log_{10}\left(\sqrt{\frac{M^2}{M^2-1}}\right).$$

For instance, for PAM with 2 levels (2-PAM), the precoding loss is approximately 1.25 dB. For larger constellations, the precoding loss decreases towards zero.

The translation from the M-PAM discrete constellation to the continuous Voronoi region performed by THP also results in an increase of the crest factor. The crest factor of a M-PAM modulation depends on M and varies between 0 dB for the 2PAM and the asymptotical 4.77 dB for arbitrary high number of modulation levels. A THP precoded signal has a constant crest factor of 4.77 dB, assuming that the whole Voronoi region is filled. The loss of crest factor is a difference between the crest factor on the input and the output and is defined as:

$$\gamma(dB) = 20 \cdot \log_{10}\left(\sqrt{3 \cdot \frac{M-1}{M+1}}\right).$$

As POF is a power-peak limited channel, the crest factor loss indeed represents decreased performance.

Figure 4:
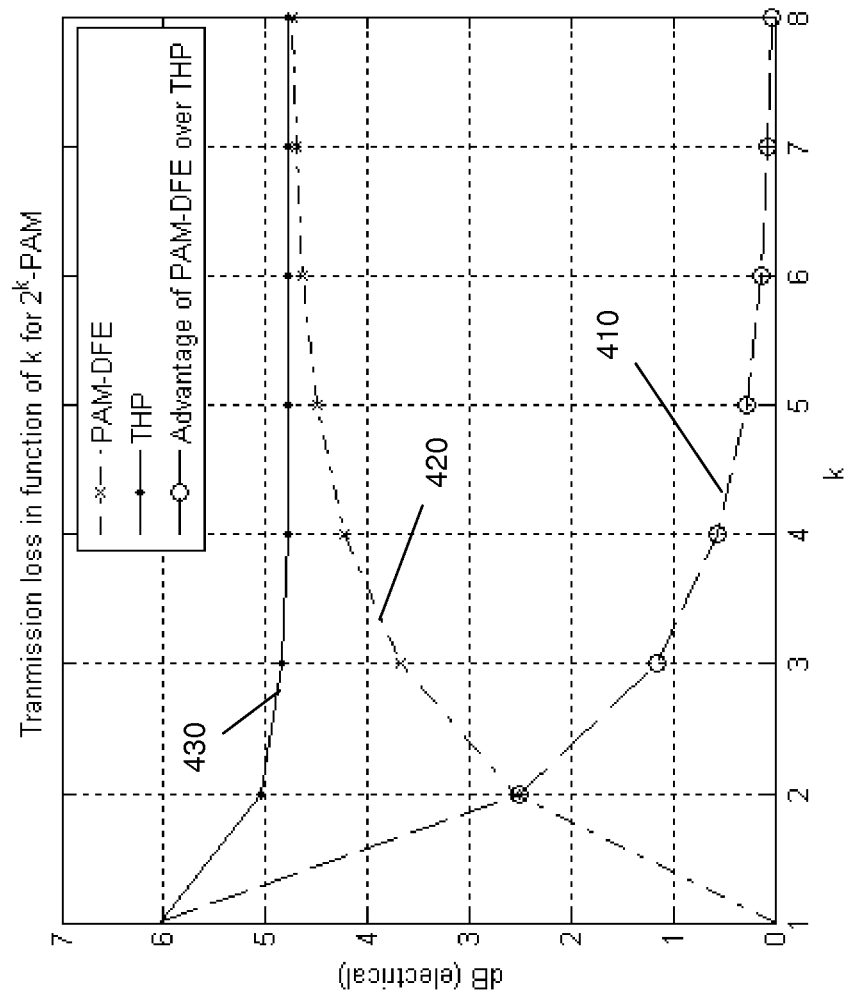
FIG. 4 is a graph illustrating the transmission performance of Tomlinson-Harashima Precoding.

FIG. 4 shows performance loss (in dB) of a transmission with THP considering both the precoding loss and the crest factor loss as a function of the number of modulation levels $M=2^k$. Curve 420 represents the loss due to crest factor of the M-PAM modulation which would be completely equalized by the receiver (decision feedback equalizer or feedforward equalizer). For 2-PAM (k=1) there is no loss, since the crest factor of 2-PAM is 0 dB. Curve 430 shows the transmission loss for THP (the precoding loss plus crest factor loss) which becomes asymptotically the same as the crest factor loss for the high numbers of modulation levels. Finally, curve 410 illustrates the advantage of M-PAM with respect to THP as a function of M. Since the crest factor for THP is constant and equal for all values of M, namely 4.77 dB, it can be seen as an extra loss due to precoding in the rather small range of M up to 4. The loss of performance is negligible for M equal to or higher than 4 (corresponding to k≥2). When M is sufficiently high, the precoded symbols are independent and uniformly distributed random variables. This implies that the statistics of the precoded symbols are very similar to the statistics of the original data symbols and the spectrum of the precoded symbols is white. Moreover, since precoding is employed at the transmitter side, there is no problem with applying a more complicated modulation coding such as trellis-coded modulation or coset coding, which require postponing of decisions and cannot be therefore well combined with a DFE at the receiver.

However, THP employed at the transmitter requires a feedback from the receiver in order to obtain current channel response. Despite this small implementation drawback, THP still remains suitable for the prevailing part of the aimed POF applications. For instance, THP is suitable for any of a star topology, daisy chain topology or tree topology. In the star topology, each node is connected to the network through a packet switch by means of a duplex POF having two fibres for the respective two directions. In daisy chain topology, some nodes have packet switching capability and more than one duplex interface. A node is connected to the network and, at the same time, works as a bridge between the different network domains with which it is interconnected. Tree topology is an evolution of the daisy chain topology, in which some nodes have more than two duplex POF interfaces. These three topologies are in general suitable for any kind of video-based sensor applications or media distribution, especially for the home network applications, industrial plants or automotive applications, in particular, interconnecting cameras and screens.

However, current automotive applications based on POF also utilize a topology of a physical ring over a simplex POF. Accordingly, several nodes are connected serially or they are connected to a central unit. Such topology is not necessarily optimum for one-sensor applications. Moreover, the implementation of a feedback channel for each pair of nodes along a common ring is difficult to implement, especially for a higher number of nodes involved. For such topologies therefore equalization techniques other than THP may be more convenient. For instance, a feed-forward equalization (FFE), which does not require feedback from the receiver to the transmitter. When physical ring topology is required, FFE may perform better than DFE due a high-spectral-efficiency M-PAM, despite the performance loss due to the noise increase. Namely, DFE may suffer from considerable error propagation in such a system.

In order to achieve an efficient employment of modulation, coding, precoding and frame structure, it is important, that these techniques are designed with regard to each other.

In particular, the present invention relates to the frame structure for transmission of user data over plastic optical fibre. The frame structure enables accommodating of the user data and additional signal for the purposes of synchronization, link control and in particular adaptive techniques such as coding and modulation and equalization.

In communication systems, the user data is transported over a physical medium such as copper wire, optical fibre, wireless channel, etc. in a well defined structure in order to enable corresponding interpretation of the data at the transmitter and at the receiver. In particular, the data is ordered in the time domain in so-called frame structure. The frame structure defines how the data is transmitted over a physical medium including the location and order of the data in the time domain. In order to enable synchronization of the receiver and detection of the data at the appropriate timing instance, synchronization sequences are included among the user data. A part of the user data, the frame structure typically includes portions dedicated to control data. Control data may be included in order to enable controlling of the data connection, controlling of a multiuser access, providing predefined pilot signals used for channel quality estimation and equalization etc. the frame structure employed in a system has an impact on the efficiency of the transmission and its design should follow the characteristics of the physical medium.

The transmission may be effected in different modes of operation. In a normal mode of operation, the frame transmission is active during all the time even when no data is transmitted. If no user data is available for transmission, idle information is sent. This results in transmitting with a certain level of power even when it is not necessary. In order to enable power saving, a low power mode may be provided. In a lower power mode, the user data is only transmitted in the payload of the frame structure if available. Accordingly, the transmission and reception of the data may be switched off during the idle phases in order to reduce the power consumption. For instance, Ethernet standard IEEE 802.3az called energy efficient Ethernet provides such a functionality. Another means for improving the efficiency of transmission and reception of data over a physical medium is the power scaling which is applied to different parts of the frame structure in accordance with the physical medium constrains and transmission characteristics.

In order to design an appropriate frame structure for plastic optical fibres, the frame structure should address the bandwidth limitations, possibly varying transmission characteristics and noise sources of all electronic and/or optical elements forming a part of the communication channel. This includes the fibre itself, the opto-electronic, and the optics. The requirements to such a frame structure are rather high in a communication system which requires achieving high performance levels corresponding to multi gigabit transmission over the plastic optical fiber. In particular, high spectral efficiency adaptive coding and modulation scheme is to be used in order to maximize the optical power link budget. The non-linear response caused by the opto-electronic elements in the transmission path has to be compensated for. Moreover, in order to equalize the inter-symbol interference, feed forward equalization or decision feedback equalization or a pre-coding at the transmitter side has to be applied. The symbol synchronization has to be advantageously designed to enable low jitter timing recovery, symbol identification among the transmitted symbols and the detection of the phase for performing efficient sampling. In order to adapt the transmission and reception to the possibly varying characteristics of the channel, a robust logical subchannel (control channel) is to be used for adaptive configuration so that the system is able to dynamically modify the pre-coding coefficients, the data rate, to transmit advertisements of the link status, negotiate physical transmission capabilities during the link set up etc. This information belongs to control data.

Figure 5:
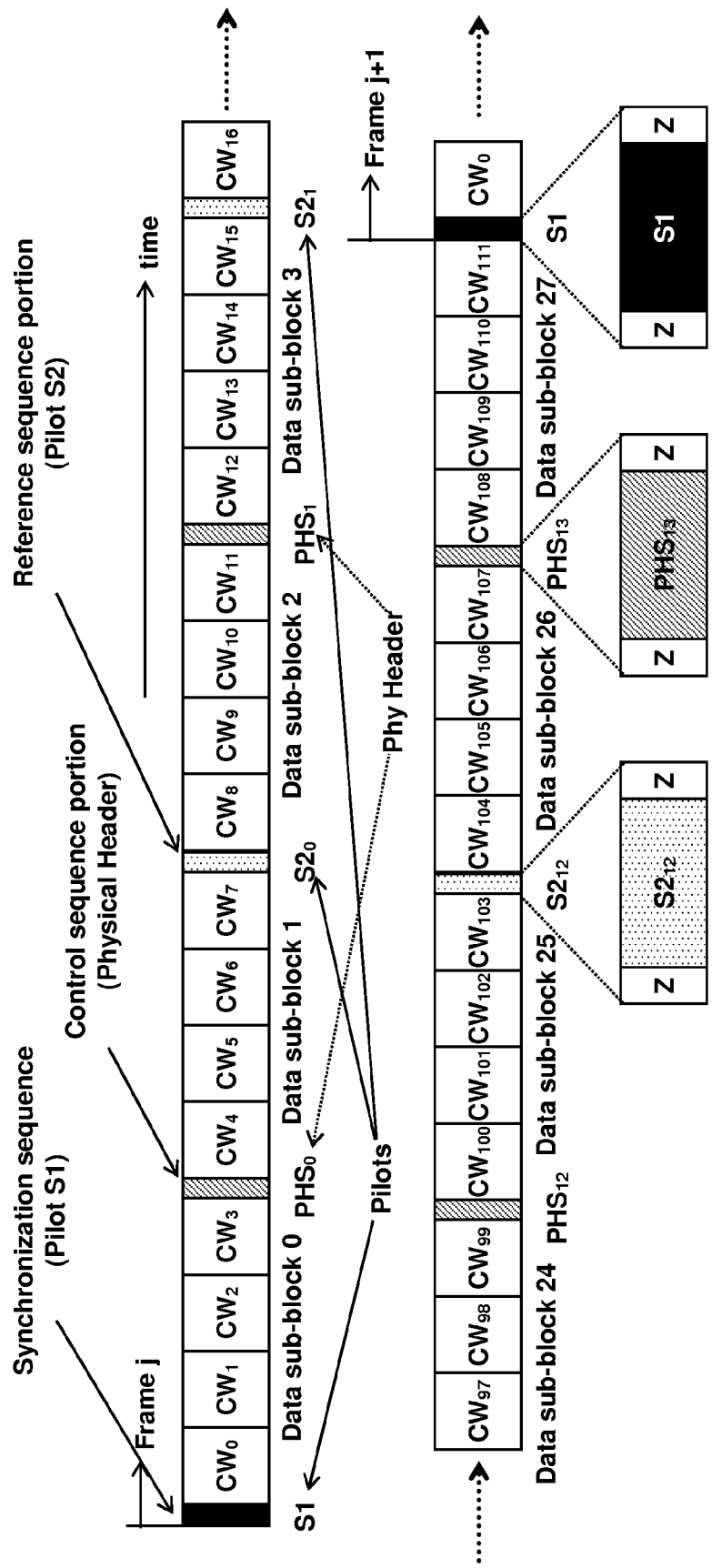
FIG. 5 is a schematic drawing illustrating an example of a frame structure in a normal mode according to an embodiment of the present invention.

FIG. 5 shows an example of a frame structure for a normal-power mode in accordance with an embodiment of the present invention. The frame includes:

Reference signals (pilots) for frame synchronization, timing recovery, non-linear channel estimation and equalization adaptation, Physical header for link startup, capabilities negotiation, user data synchronization, adaptive precoding and adaptive bit-rate, and Payload data blocks, which include high coding gain forward error correction (FEC), modulation and precoding.

In particular, a frame j includes a synchronization portion S1 at the beginning of the frame. The portion S1 includes a sequence of symbols for frame synchronization and timing recovery. As can be seen in FIG. 5, frame j+1 following frame j also starts with the synchronization portion S1. The synchronization portion S1 is followed by a payload data block (user data portion) which includes multiple codewords $CW_0$, $CW_1$, $CW_2$, and $CW_3$ of an error correcting code. The user data in the data block is preferably coded with a high coding gain forward error correction and modulation scheme. For instance, the multi-level coset coding (MLCC) scheme provided in the European patent application no. 11002046.8 (and incorporated herein by reference) is preferably adopted. This scheme transmits data over POF coded by a three-level coset code. The first level includes BCH coding, the second level includes BCH coding with a higher coderate than the first level, and all three levels include respective mapping to a constellation and lattice transformation of the mapped symbols. The levels are then added and the resulting coded symbols are mapped onto a time-domain modulation. The second level provides two selectable BCH codes with substantially the same coderate and different codeword length. Correspondingly, the decoding may be preformed by multi-stage decoder. Accordingly, the codewords $CW_0$, $CW_1$, $CW_2$, and $CW_3$ may be codewords of the MLCC code.

The data may also be pre-coded. In order to enable negotiation of capabilities, user data synchronization, controlling the adaptive precoding and adaptive bitrate a physical header is included into the frame structure to accommodate control information. This is illustrated in FIG. 5 by portions PHS0, PHS1, . . . PHS12, and PHS13. These physical header portions are included into the frame structure in regular distances from each other within the same frame. In particular, in FIG. 5 the physical header is included each 8 data subblocks. The physical header portions PHSx, x=0, . . . 13, are included within the frame alternately with the reference symbol sequence portions S2y, y=0, . . . 12.

The reference symbol sequence portions S2y are inserted within the frame in order to enable timing recovery, non-linear channel estimation and equalization adaptation. In particular, reference symbol portions $S2_0$, $S2_1$ and $S2_{12}$ are shown. These reference signal (pilot) portions S2 are located between the physical header locations in possibly equidistant temporal distances. The frame j in FIG. 5 includes 28 data subblocks numbered 0 to 27, wherein each subblock further includes four slots CWi with i being an index from 0 to 111. A synchronization portion S1, a reference signal portion S2 or a physical header portion PHS is included every four data codewords (CW). However, it is noted that this frame structure is only an example and that in general different numbers of codewords in a subblock as well as subblocks (user data portions) in a frame may be employed and that the distance between the pilot and synchronization portions as well as the physical header portions may differ.

Summarizing, the frame of FIG. 5 comprises pilot signals, a header and a payload of a predefined length. The pilots and header are divided in sub-blocks and inserted in between the payload sub-blocks. Each header or pilot sub-block is composed of predefined number of symbols. For pilot and header sub-blocks, the first several symbols and the last several symbols take value zero. Each payload sub-block is composed of an integer number of MLCC code words. The transmission of MLCC code words is aligned with the start of the payload sub-blocks. The code word length may be configured in the MLCC code. At the beginning, a default length of the codeword may be applied. In the example of FIG. 5 the sub-block consists of 4 MLCC code words. However, this is only an example and, in general, another number of codewords may be used. The pilot (S1, S2x) and header (PHSx) sub-blocks are transmitted once per payload sub-block. The frame follows the same pattern starting by an S1 block and alternating S2 and PHS sub-blocks, even when the low power mode is used as will be shown below.

Figure 6:
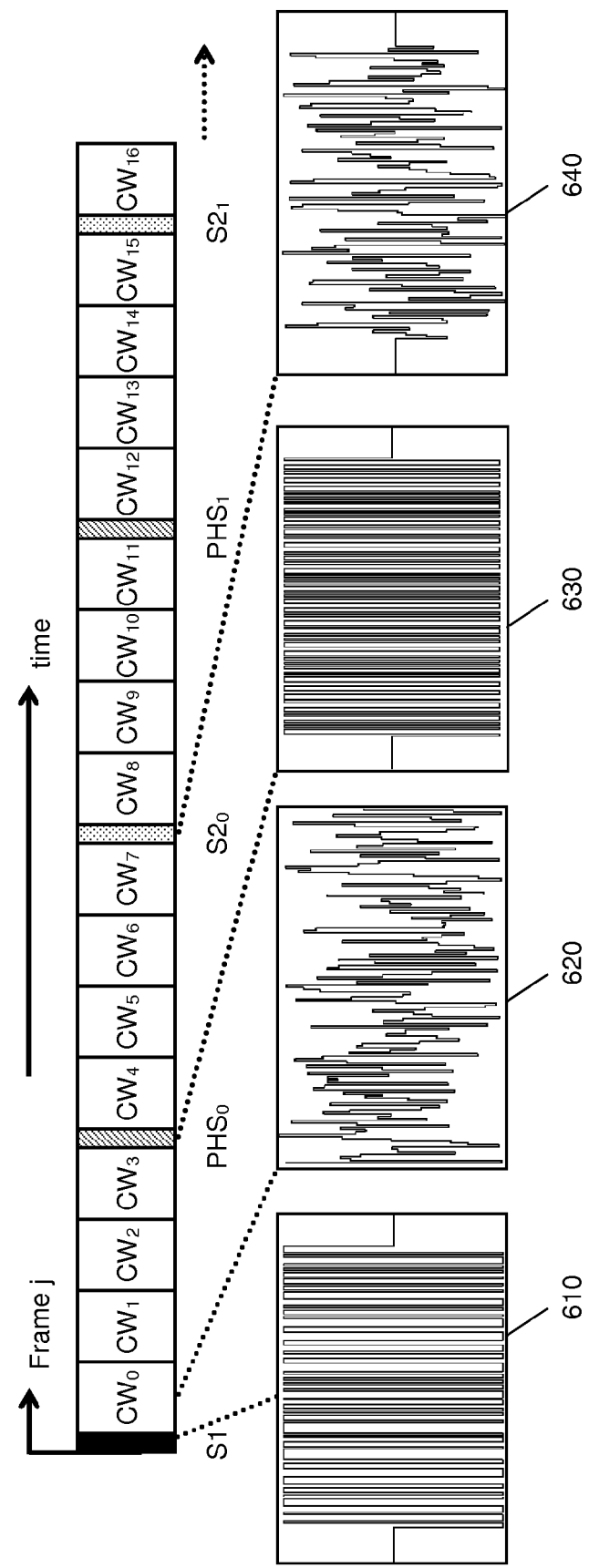
FIG. 6 is a schematic drawing illustrating an example of a signal transmitted within the synchronization, pilot and physical header portions of a frame.

FIG. 6 illustrates preferred characteristics of the synchronization portion S1 and the reference signal portions S2y as well as the physical header portions PHSx in terms of a signal. In particular, frame j starts with a synchronization portion S1 including a sequence of reference symbols (pilots) for the purpose of frame and/or symbol synchronization and time recovery. As can be seen, portion 610 representing the synchronization portion S1 starts with a zero signal and ends with a zero signal. The zero signal here corresponds to an average optical power, after the current-to-optical-power conversion in the LED. Zero signal is used to accommodate the channel impulse response, the estimation of which is further used by Tomlinson-Harashima precoding advantageously applied to the used data. As can be seen also in the figures, in this case, the zero signal does not represent the lowest signal value. The term "zero" here relates rather to a logical signal level of "0". In particular, the zero signal is a constant signal of a predefined, here the average—zero, level. The pilot symbols included have two possible levels, 1 and −1. Frame j starts with this synchronization portion S1, 610. The synchronization portion is followed by a first data subblock formed by four codewords $CW_0$ to $CW_3$. The data subblock carries payload which may be pre-coded by THP and encoded and modulated by the MLCC forward error correcting code. The data may be encapsulated by multiple protocols such as Ethernet protocol, a protocol for carrying particular payload types such as video or audio, SPI or I2C, or any other higher layer protocols.

After the first data subblock, the physical header portion 620 is included. Unlike the payload portion 620, which accommodates symbols having more than two levels, the physical header is preferably transmitted using a modulation which enables a robust transmission. The example of FIG. 6 shows a corresponding physical header portion 630, which only includes a signal with two levels. However, it is noted that this is only an example and in general the physical header may also be encoded using more levels. It is nonetheless beneficial when the physical header is coded with fewer levels than the payload data in order to increase the robustness of the control information carried in the physical header. The physical header may carry in particular control information related to link setup, negotiation of a particular pre-coding and pre-coding parameters and/or parameters of modulation encoding schemes.

FIG. 6 further shows a pilot portion S2 640 for carrying predefined pilot sequences which may be used for non-linear channel estimation, equalizer adaptation and timing recovery. Unlike synchronization portion S1, the pilot sequence S2 includes symbols with multiple modulation levels. This is particularly beneficial for non-linear channel estimation and equalizer adaptation. As can be seen from FIG. 6, all non-data portions S1, S2, and PHS start and end with a zero signal portion in order to separate them from the preceding or succeeding data subblocks and to thus mitigate the impact of the inter-symbol interference between frame sections.

The frame structure shown in FIGS. 5 and 6 is appropriate for continuous transmission of the frame independently of user data availability. This means that even when the user data are not available, the frame is transmitted and the payload data blocks are filled with idle information. Accordingly, the receiver can easily track changes of the received signal such as baseline wander, attenuation variations, clock frequency deviations etc. The tracking may be performed, for instance, by using the synchronization and reference signals (pilots) S1 and S2, and physical header portions PHS.

Figure 7:
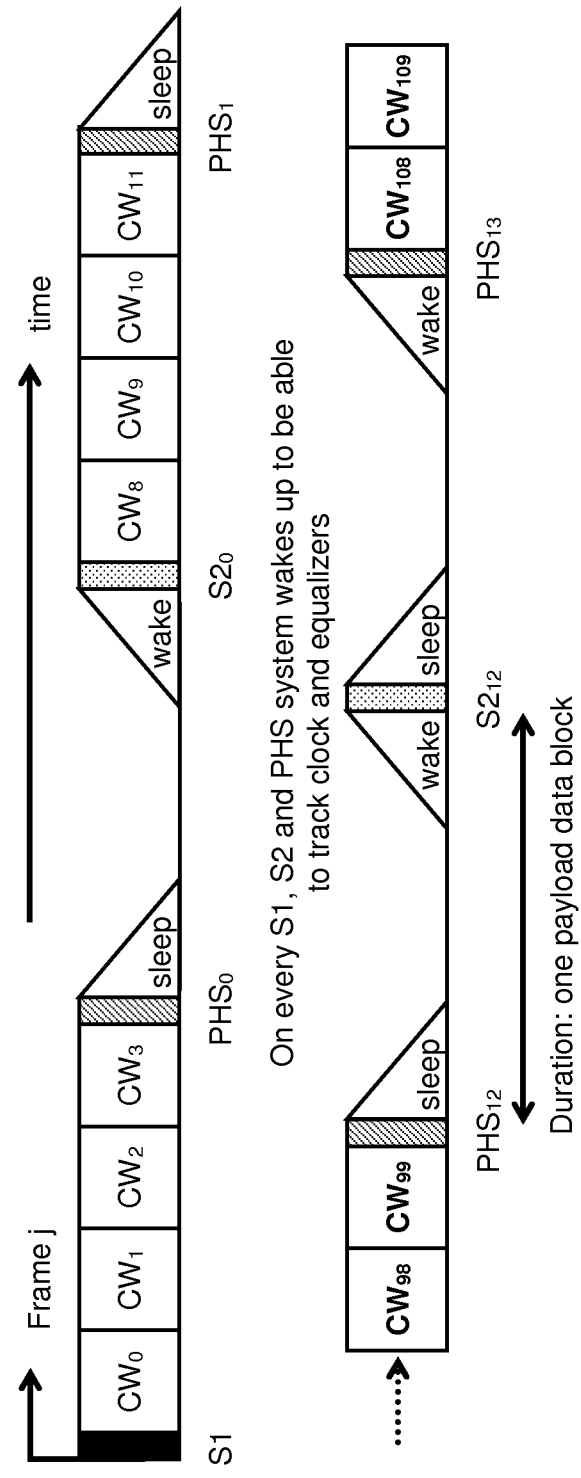
FIG. 7 is a schematic drawing illustrating an example of a frame structure in a low-power mode according to an embodiment of the present invention.

FIG. 7 illustrates an alternative frame structure which is particularly advantageous for a low power mode. In the low power mode, the synchronization portion S1, the pilot portions S2 and physical header portions PHS are transmitted in the same way as in the normal mode shown before. However, the data subblocks are only transmitted when user data is available. Accordingly, the frame structure enables power saving by not transmitting any idle payload if user data is not available. This is illustrated in FIG. 7 by "sleep" at the beginning of a data subblock (user data portion) and by "wake" at the end of the data subblock. After control data (such as synchronization, pilot, header data), the optical power is switched/ramped down (sleep) for the duration of the data subblock in which no data is to be transmitted and switched/ramped up (wake) at the end of the data subblock for transmitting of the next control information. It is noted that the ramping down and up is a consequence of the switching which typically in real systems cannot be performed instantly but needs some time to turn the power on or off. In this time the optical power increases or decreases. It is noted that this switching-off the optical power does not result in "zero" signal mentioned above (which is transmitted with a non-zero optical power but represents the logical "zero" of the logical bipolar signal). It rather corresponds to in essential no (zero) optical power output.

In other words, on every S1, S2 and PHS portion, the system wakes up to be able to track clock and equalizers. For the duration of one payload data block (data subblock) the power is turned off or down (to a low level) in order to achieve power saving when no user data is available to transmit. The physical header may be used by both link ends (transmitter, receiver) to agree the usage of low power mode during the startup. All the pilot and header subblocks are transmitted but the transmission can be stopped during the payload subblocks. Accordingly, the receiver is still able to follow the frame synchronization time recovery, channel estimation and equalization adaptation, and adaptive pre-coding and adaptive bitrate. The low power mode in this example always affects a complete payload block so that it is not possible to stop or re-start the transmission in the middle of a payload subblock. The amount of power saving will depend on the percentage of time required to sleep and wake up the system compared to the payload subblock length. This percentage depends on the implementation and the real opto-electric components used therein. In general, the power may be turned-off. However, there may be embodiments, in which there still is a remaining amount of power so that the power is turned-down. Moreover, in this example the power-down relates to the entire subblock. However, in general, the switching off/down/on/up may be also performed for a subset of the codewords (CW). For instance, the first CW and/or last CW may always be transmitted or the like. This may have disadvantages and may require the corresponding signaling in PHS. On the other hand, when the entire data subblocks are switched off/on, then the receiver only need to switch on for receiving the S1, S2 and PHS, and switch off if it detects that the following data subblock was switched off by TX (detects no power over a given N number of symbols). No signaling is thus necessary.

Figure 8:
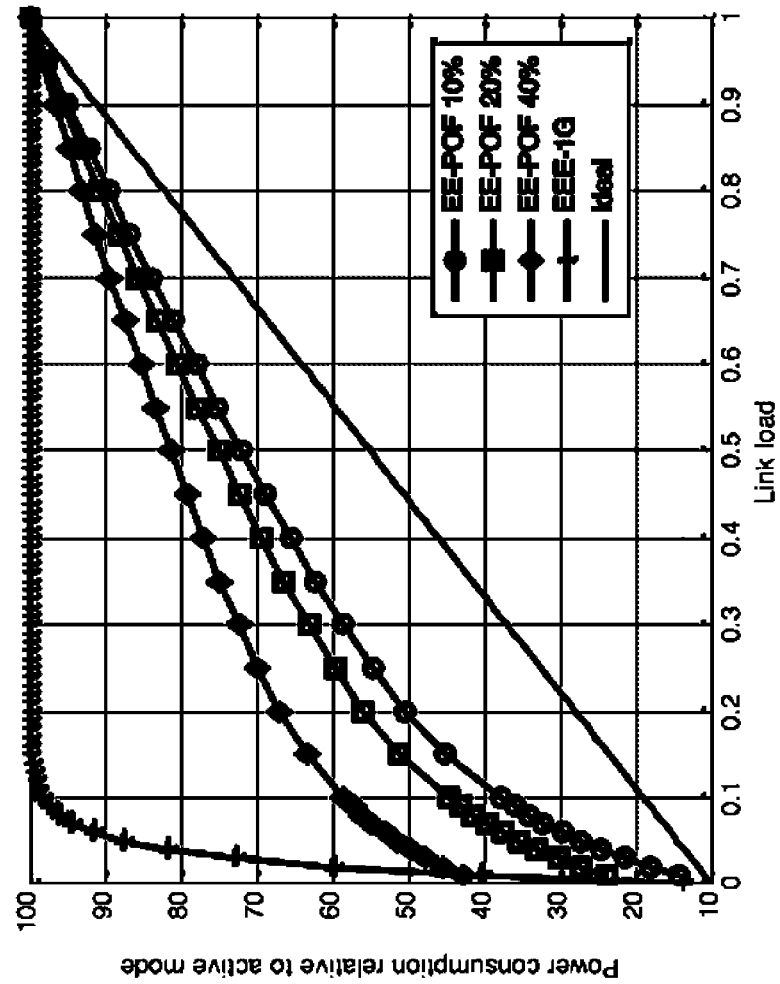
FIG. 8 is a graph illustrating the performance of an example frame structure according to the present invention with other well-known approaches in terms of power consumption as a function of the traffic load when low-power mode frame structure is applied to transmission.

FIG. 8 illustrates the power saving achieved by the low power mode frame structure relative to the normal mode as a function of the link load. In particular, the graph shows the power consumption as a function of the traffic load when low-power mode frame structure is applied to the transmission. The power consumption is represented relative to the active mode for traffic load with Poisson arrivals of 600 bytes Ethernet packets. The ideal dependency would be a linear dependency shown in the figure as "ideal" and meaning that the power is only transmitted when the data is transmitted. This corresponds to instantaneous switching up and down the power. The three curves above the ideal curve denoted as EE-POF represent transmission in accordance with the low power embodiment described with reference to FIG. 7. The curves differ in the assumption of the percentage of time required for waking up and sleeping transitions compared to the data subblock time. In particular, sleep+wake up transitions of 10%, 20% and 40% of data subblock time are illustrated. The uppermost curve illustrates the efficiency of the EEE-1000 base-T (1 Gigabit per second transmission) frame structure. It is noted that based on the current state of the art in opto-electronics, the transition times corresponding to waking up and sleeping transitions below 10% are feasible. Accordingly, the power saving which may be achieved by employing the structure described with reference to FIG. 7 is substantial. As can be seen in the graph, the power consumption scales in an almost linear fashion with the link load.

The position and the characteristics of the synchronization, pilot and header portions within the frame may have a considerable impact on the efficiency of the transmission. In accordance with the present invention, two types of synchronization pilot sequences are distinguished, namely, the synchronization portion S1 and the pilot portion S2. The synchronization portion S1 is transmitted once at the beginning of the frame. It is designed to facilitate frame synchronization, i.e. detection of the frame borders. Accordingly, the receiver should be able to detect a start of the frame. Preferably, the synchronization sequence S1 corresponds to a pseudo-random sequence of 2-PAM symbols. This means that the synchronization sequence only includes symbols of two possible levels, high and low. The length of the 2-PAM symbol sequence is preferably selected so as to provide low variance of the detection at the receiver. Apart from the advantages of the PAM modulations mentioned above, the 2-PAM modulation has the advantage that it is simple. The information (the synchronization sequence) is known a priori by the receiver and thus the receiver is able to implement a data aided algorithm for the detection of the frame boundaries. For instance, correlation with the synchronization sequence at the receiver may be implemented by using a tree of adders and multiplexers, since the reference signal takes values from the set {−1, 1}. The symbols in the synchronization sequence S1 may also be used for the timing recovery allowing searching for the optimum sampling point (phase synchronization that depends on the channel delay group and channel impulse response). For instance, Müller-Müller or Bergman's clock recovery algorithms may be employed, which operate at a symbol rate (for more details see, for instance, Kurt H. Mueller, Markus Müller, "*Timing recovery in digital synchronous data receivers*", *IEEE Trans. On Communications*, vol. com-24, no. 5, may 1976, pp. 516-531 and Jan W. M. Bergsmans, et al., "*A class of data-aided timing-recovery schemes*", *IEEE Trans. On Communications*, vol. 43, no. 2/3/4, February/March/April 1995, pp. 1819-1827, which are incorporated herein by reference). The power scaling of pilot sequence S1 is selected in such a manner that the transmission of this frame subblock uses the full range of the light emitter device so that the available SNR in the receiver is maximum to guarantee a robust detection. Accordingly, the high and low level of the 2-PAM correspond to the full range of the transmitter. As describe above, the synchronization portion S1 is pre-pended and appended by zero sequences. Zero sequences correspond to average optical power after the electrical to optical power conversion. Therefore, the optical power of zero sequence is equal to the mid point between the extreme values taken by S1 pilot. The length of each zero symbol sequence is preferably designed to be able to contain the complete channel impulse response, in particular the most representative channel response taps. These may be determined as the taps with (average) power exceeding a predefined threshold. These zero signal portions surrounding each of the S1, S2, and PHS portions enable that the symbol interference is reduced/avoided. In particular, the zero sequences are inserted before and after 2-PAM symbols for avoiding the inter-symbol interference caused by the previous payload data subblock over the synchronization portion S1 and to avoid inter-symbol interference of synchronization sequence S1 over the next (following) payload data subblock. The 2-PAM symbols are sufficiently robust for frame synchronization and timing recovery (symbol sampling point adjustment) over non-linear channels such as channels formed by plastic optical fibre and the corresponding opto-electronics. However, they may be insufficient for channel estimation and equalization purposes.

FIG. 9 illustrates a possible implementation of a synchronization signal generator. In particular, a binary maximum length sequence (MLS) generator may be used to generate a binary pseudorandom sequence of $L_{S1}$ bits length. After generating the sequence, the sequence is modulated by a 2-PAM modulation. Before transmitting the modulated sequence over the channel, a power scaling factor may be applied. The power scaling factor is relative to the factors applied to the remaining parts of the frame. In particular, the power scaling factor is defined by an integer k0, wherein k0 is defined as the maximum of $2^{k0}$ PAM constellation, which the system can manage in a payload data subblock and/or pilot sequence S2. The integer k0 is used to define the scaling factor for all the parts composing the frame. The integer k0 has to be high enough to allow fine resolution and to define the scaling factors for different portion of the frame. It is here assumed that the constellations of all frame parts are normalized to the arbitrary range $[-2^{k0}, 2^{k0})$ after scaling. FIG. 9 shows k0=8 which corresponds to maximum 256-PAM modulation in payload data subblocks and/or pilot sequence S2. Symbol $F_s$ denotes the symbol rate output from the synchronization symbol generator after the power scaling.

As can be seen in FIG. 9, an MLS generator 910 generates a pseudorandom sequence $L_{S1}$ bits. The MLS generator may be implemented by linear feedback shift registers by shifting and adding operations. The generated said random bit sequence of zeros and ones is multiplied by factor 2, resulting in a sequence of levels 0 and 2 from which a constant one is subtracted 920 resulting in a sequence with levels −1 and 1. This sequence is provided from the generator 950 to the power scaling block 960, which applies the scaling factor (in this example factor 255) by multiplying 970 the generated said random sequence, which is then output at the symbol rate $F_s$. The output sequence is scaled to have the values −255 and +255 (in general, $-2^{k0}+1$ and $2^{k0}-1$).

FIG. 10 illustrates the output synchronization sequence S1, generated as described above. In particular, the zero symbol sequence of $L_{S1z}$ symbols is pre-pended and appended (1001, 1009) to the actual synchronization sequence. Between the two zero symbol sequences 1001, 1009, $L_{S1}$ symbols of the power scaled, MLS generated, 2-PAM symbols 1010 are inserted. The preferred design, particularly advantageous for gigabit over plastic optical fibre, includes $L_{S1z}$=16 zero symbols at 312.5 mega symbols per second (MSps). Correspondingly, the length of the 2-PAM symbols is preferably $L_{S1}$=128 symbols at the same rate of 312.5 mega symbols per second (MSps).

Pilot sequence S2 preferably has a different design. Advantageously, it includes a sequence of M-PAM symbols. As the channel is non-linear, more than two levels are useful in order to excite and extract all the information of the channel response. Since the pilot sequence S2 is known a priori by the receiver, a data aided estimation algorithm may be implemented at the receiver for the purpose of non-linear channel estimation. For instance, recursive least square (RLS) estimation based on truncated Volterra series may be applied, in which, for instance, DC, first order, second order and third order responses can be estimated (for more details see, for instance, V. John Mathews, "*Adaptive Polynomial Filters*", *IEEE Signal Processing Magazine*, July 1991, pp. 10-26, which is provided herein by reference). The Volterra based response may be used in the receiver to linearize the channel response in order to improve the reliability of the data detection. The pilot sequence S2 may also be used for equalization adaptation such as estimation of a feed forward equalizer, a decision feedback equalizer or a Tomlinson-Harashima precoding equalizer, in particular, for estimating of the precoding coefficients. Since the data aided algorithm for channel estimation and equalization requires rather long training sequences in order to converge, the pilot sequence S2 needs to be rather long. In order to avoid a latency of the user data transmission, in accordance with the present invention, it is advantageous to divide the pilot sequence S2 into several chunks (portions) rather than to transmit the entire S2 portion at once. Preferably, the length of each pilot sequence chunk S2, is equal to the length of the synchronization sequence S1. The variable x is an index referring to a particular S2 portion, the index being an integer with a maximum value corresponding to the number of the S portions per frame.

The temporal separation between S2 chunks and S1 synchronization sequence is preferably the same as can be seen also in the embodiment described with reference to FIGS. 5 to 7. The pilot sequence S2 may be used together with the synchronization sequence S1 for timing recovery since they represent a time base for the received signal. In other words, the portions of the synchronization symbols S1 and pilot symbols S2, are periodic in a sequence of frames with a predefined frequency. Similarly, as in the case of the synchronization sequence S1, each S2 chunk is pre-pended and appended by a zero sequence to avoid inter symbol interference.

The payload data subblocks may be precoded so that the post cursor inter-symbol interference is eliminated, for instance in a TH precoder. However, in the receiver the non precoded parts S1, S2 and PHS may still produce post cursor interference. Preferably, the precoding is not applied to the S1, S2, and PHS in order to make them independent from the communication between the receiver and transmitter.

The power scaling for the pilot sequence S2 is advantageously applied in such a manner that the extreme values of M-PAM modulation (M−1 and −M+1 for PAM symbols {−M+1, −M+3, . . . M−3, M−1} maintain the extremes of the full range of the light emitter device.

FIG. 11 illustrates an example of a generator of the pilot sequence S2. The pilot sequence S2 is preferably a pseudo random sequence generated by a maximum length sequence generator (MLS), similarly as in the case of the synchronization sequence S1. The length of the generated sequence is preferably $k0 \times L_{S2}$ bits. Looking at FIG. 11, the MLS generator 1110 generates a sequence of zeros and ones with a length of $k0 \times L_{S2}$. This sequence of bits is converted from serial to parallel 1020. This results in a sequence of $L_{S2}$ symbols, each symbol with k0 bits. The symbols are multiplied by 2 and centered 1030. The resulting centered sequence is power scaled by a factor 1 relatively to the definition of power scaling factor provided with respect to the synchronization sequence generation. A sequence of $L_{S2}$ symbols with values {−255, −253, . . . , 253, 255} is output at the symbol rate $F_s$. The serial to parallel conversion 1120 corresponds to modulation by $2^{k0}$-PAM. In particular, the bits are grouped in k0-bit chunks to form a sequence of unsigned integer numbers (signal levels). The power scale factor is applied before transmission to the channel. The power scale factor is relative to the factors applied to the other parts of the frame. It is assumed that constellations of all the frame parts are normalized to the arbitrary range $[-2^{k0}, 2^{k0}]$ after scaling. It is noted that the above examples illustrate a case in which k0 is equal to 8. However, in general, any other value of k0 may be employed.

Figure 12:
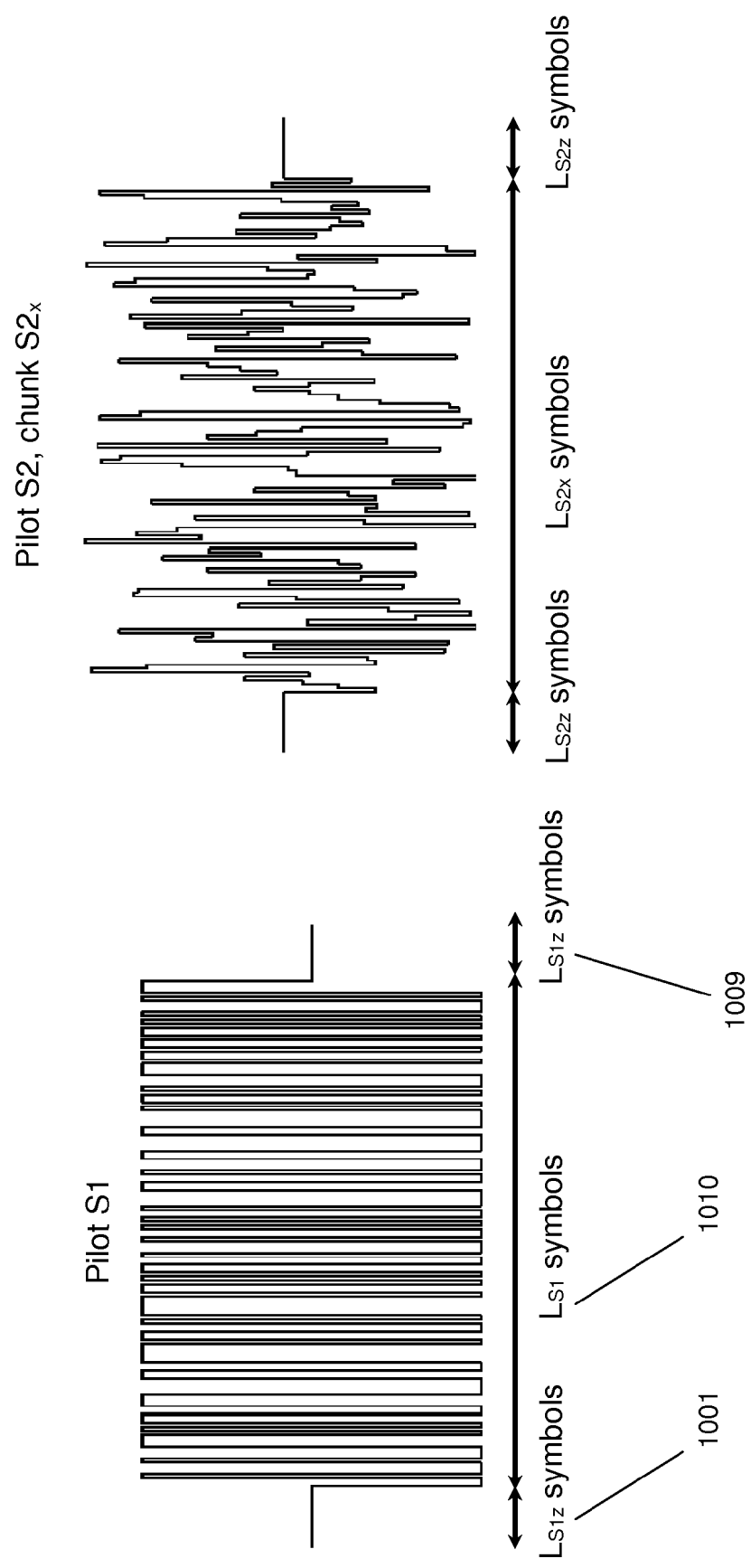
FIG. 12 is a schematic drawing illustrating a signal corresponding to the generated reference signal portion.

After the sequence of $L_{S2}$ M-PAM symbols has been generated, the sequence is divided in chunks of $L_{S2x}$ symbols wherein, preferably, $L_{S2x}=L_{S1}$. Each of the chunk is pre-pended and appended by a sequence of zero symbols of a length $L_{S2z}$. Preferably, also $L_{S2z}=L_{S1z}$. In other words, the length of the pre-pended and appended zero symbol sequences for the synchronization sequence and the pilot sequence are of the same length. Moreover, the length of the synchronization sequence portion S1 equals the length of the pilot portion S2x FIG. 12 illustrates the signal representing the pilot sequence S2. In particular, a chunk S2x of the pilot S2 is illustrated. The chunk S2x is pre-pended and appended a sequence of $L_{S2z}$ symbols. The pilot sequence chunk S2x itself includes $L_{S2x}$ symbols. In accordance with a preferred design for gigabit over plastic optical fibre, the length of the zero symbol sequences pre-pended and appended to the pilot sequence chunk is 16 symbols at 312.5 MSps. The length of the M-PAM symbol sequence constituting the pilot S2 is preferably 1664 symbols at 312.5 MSps. This symbol sequence is subdivided into chunks, each comprising preferably 128 symbols at the same symbol rate and the number of pilot sequence chunks S2x is preferably 13. Accordingly, the number of synchronization and pilot sequence portions S1 and S2x in a frame is 14 as also already shown in the examples of FIGS. 5 to 7. The number of levels of the M-PAM is preferably 256. It is noted that this configuration is an example which is particularly advantageous for plastic optic fibre. However, different values may also be selected without limiting the present invention. In particular, the frame may have a different number of pilot sequence chunks and/or the user data portions. The user data portion may have a different number of codewords included. The included user data do not have to correspond to the codewords (or integer multiple of codewords) of a preceding forward error correction code.

The physical header includes control information. In particular, the control information is used for the adaptive configuration, which enables the system to dynamically adapt a set of Tomlinson-Harashima precoding coefficients and the user data bitrate. The adaptation of the user data rate may be preformed by specifying the amount of redundancy to be added to the user data and/or the configuration of the spectral efficiency at each level of a MLCC scheme, in case of being used. This may be achieved, for instance, by specifying one of the predefined code rates of the coding (and modulation) as already described above. The physical header data may further include advertisement of the link status and negotiation of the physical transmission capabilities at the link start up and/or other link start up commands. In general, it includes control information related to the user data transmission on the physical layer.

Preferably, the physical header is designed to be decoded by the receiver in a more robust way than the user data encapsulated in the payload data subblocks (user data portions). In particular, the binary information carried by the physical header may be scrambled and encoded with a forward error correction code before modulation. The forward error correction code is designed according to the error correction capability provided by the forward error correction code used in the payload data in such a manner that the error probability of the physical header decoding is always lower.

In addition, a cyclic redundancy check (CRC) may be added before the forward error correction coding for the error detection capabilities in the receiver, so that the receiver is always able to know whether the header is correct. Preferably, in order to provide a robust transmission of the header, 2-PAM modulation based on two-dimensional (2D) binary phase shift keying (BPSK) mapping is employed. This modulation improves the noise margin by three decibels with respect to payload data in the worst channel conditions when assuming that both parts use the same forward error correction. This will be exemplified in more detail below.

Figure 13:
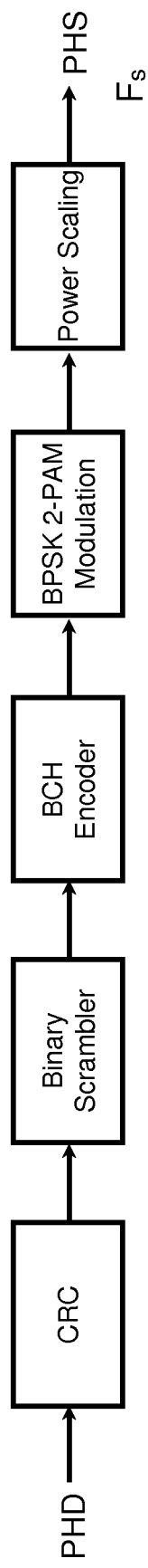
FIG. 13 is a block diagram illustrating processing of the control information (physical header)

FIG. 13 illustrates the encoding chain of the physical header in accordance with an embodiment of the present invention. Preferably, a binary BCH code is employed as a forward error correction code. For instance, a CRC of 16 bits is inserted. An example of a generator polynomial is:

$$1+x^2+x^5+x^6+x^8+x^{10}+x^{11}+x^{12}+x^{13}+x^{16}.$$

Figure 14:
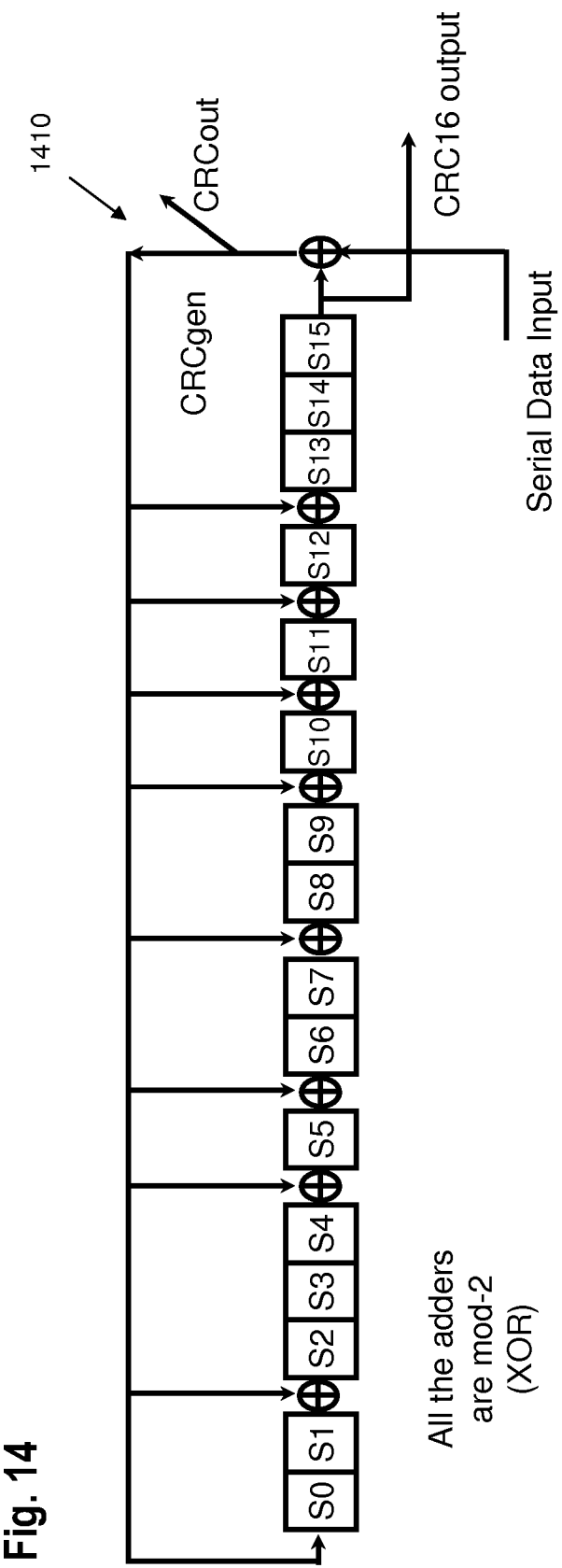
FIG. 14 is a block diagram illustrating an example of an implementation of the cyclic redundancy check generation addition to the physical header.

FIG. 14 illustrates an example of the corresponding generation of the CRC parity bits. At the beginning of the calculation, the sixteen delay elements S0 to S15 may be initialized to zero. For instance, the physical header of 704 bits may be used to compute the 16 bit long CRC in the state CRCgen with the switch 1410 connected. After the corresponding 88 octets (equal to 704 bits) of the header have been serially processed, the switch 1410 is de-connected corresponding to the setting CRCout in FIG. 13. Then the 16 stored values S0 to S15 correspond to the calculated CRC 16, which is transmitted in the order from S15 to S0.

The BCH encoding is a systematic coding in which the parity is transmitted after the information message. An example of such systematic encoder is illustrated in FIG. 15.

Figure 15:
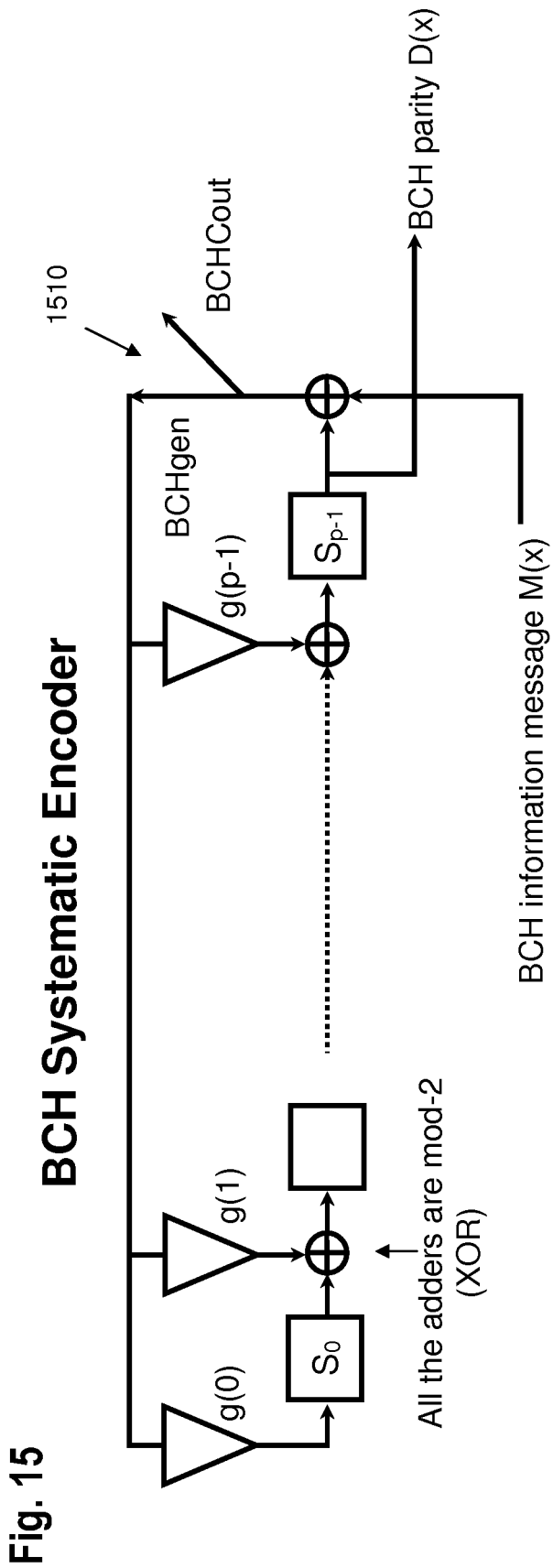
FIG. 15 is a block diagram illustrating an example of an implementation of a BCH code for using in the physical header coding.

FIG. 15 illustrates a systematic BCH encoder, which may be employed in protecting the physical header. In particular, the BCH coding may be performed in two steps, namely:

Multiplication of M(x) by $x^{n-k}$, wherein M(x) is the information (message) of a length of k bits to be encoded, and Calculation of D(x) as the remainder of division M(x)·$x^{n-k}$ by G(x).

All the delay elements S0, . . . Sp−1, shown in FIG. 15, should be initialized to 0, before encoding. All the k bits forming the information message M(x) are used to calculate the parity D(x) in the state BCHgen of the switch 1510. After all the k bits have been serially processed, the switch 1510 is disconnected (BCHout setting) and the p stored values (S0 . . . Sp−1) are output as the parity D(x). D(x) is transmitted in order from Sp−1 to S0.

The physical header sub-frame (PHS) may be obtained after the CRC, binary scrambling, BCH encoding and BPSK modulation. The particular way of physical header encoding is preferably independent from the M-PAM modulation and equalization used for payload data subblocks. This enables the reception of the physical header at the reset of the system for starting the negotiation of the adaptive bitrate, precoding, capabilities negotiation etc.

Regarding the preferred design of coding for Gigabit over POF, an Adaptive Error Correcting Code as described above is applied, that defines a FEC suitable for the payload data sub-blocks. The preferred parameters of the code are the code-word length in number of bits of nh=896 bits, the number of information bits kh=720 bits, the number of parity bits ph=176 bits, code-rate of rh=720/896=~0.8. Moreover, BCH over Galois' Field GF(2m), where m=11 and error correction capability t=16 is applied. This is a shortened version from primitive BCH (2047, 1871). The shortening is implemented by prepending 1151 zero bits to 720 data bits. In order to minimize the Galois Field Arithmetic the irreducible polynomial of minimum weight $1+x^2+x^{11}$ may be selected. The Generator Polynomial is given by $$G(x) = \sum_{i=0}^{P_h} g(i) \cdot x^i$$

wherein g(i) takes only values 0 or 1 (binary values). The order of G(x) for this BCH code is 176 bits and the G(x) coefficients are given for instance by:

'h0001_A3E8_171D_BCA4_EE1E_
7CDC_A7DA_FB8D_8F39_8072_8516_6007 wherein g(0) corresponds to the Least Significant Bit (LSB).

Figure 16A:
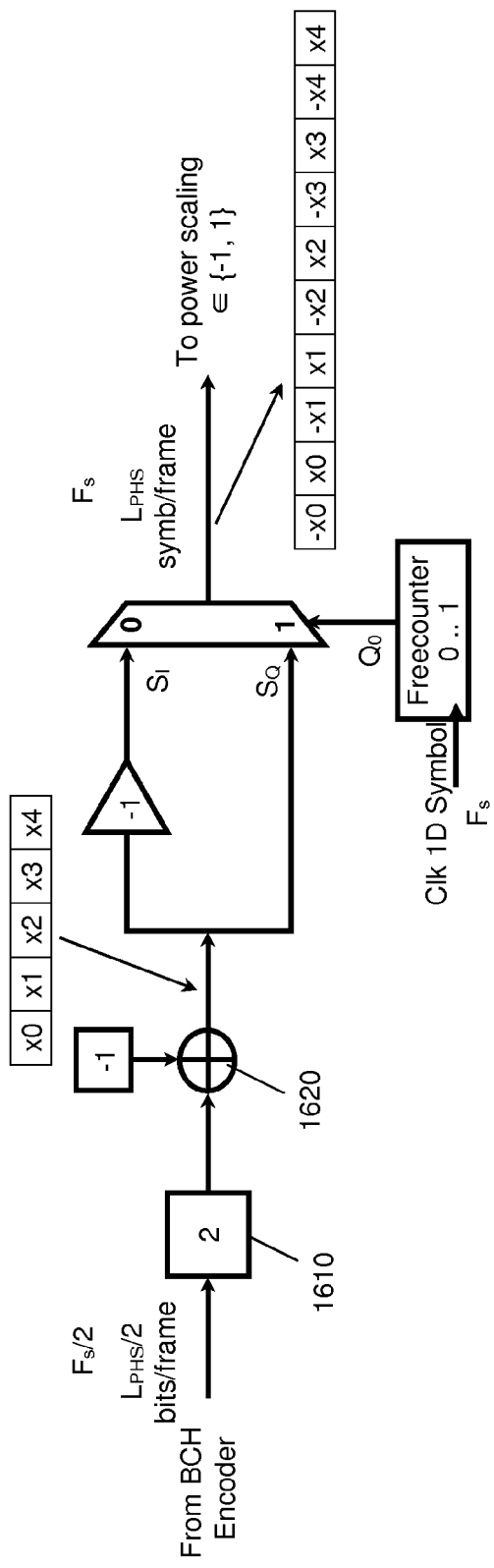
FIG. 16A is a block diagram illustrating an example of an implementation of a physical header modulation.

A robust modulation may be employed to the header in order to ensure its correct reception. FIG. 16A shows an example of such a modulation which is a two-dimensional (2D) binary phase shift keying (BPSK) 2-PAM. A BPSK 2-PAM is a modulation leading to the efficiency of 0.5 bits per dimension and used to increase by three decibels the noise margin with respect to the payload data block decoding. The header is preferably not precoded by Tomlinson-Harashima precoding so that it can always be equalized at the receiver independently of the transmitter. In case Tomlinson-Harashima precoding has been used for payload subblocks, the quality of signal is boosted by six decibels with respect to user data in detection.

As can be seen in FIG. 16A, the bits from the BCH encoder are scaled 1610 and centred 1620 obtaining a bit sequence x0, x1, x2, x3 and x4. This bit sequence is further modulated to in phase and quadrature components Si, Sq and output in a resulting sequence of:

−x0,x0,−x1,x1,−x2,x2,−x3,x3,−x4,x4.

This output sequence is then power scaled and transmitted.

Figure 16B:
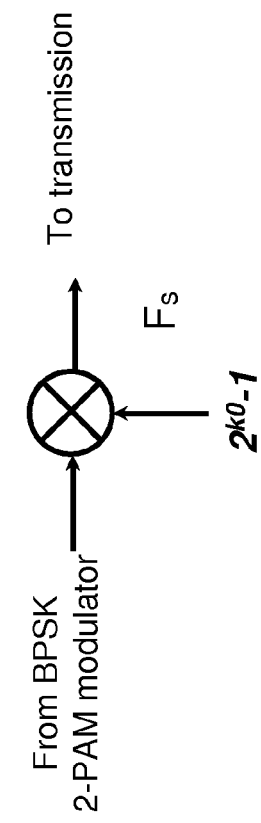
FIG. 16B is a block diagram illustrating an example of an implementation of a physical header power scaling.
Figure 17:
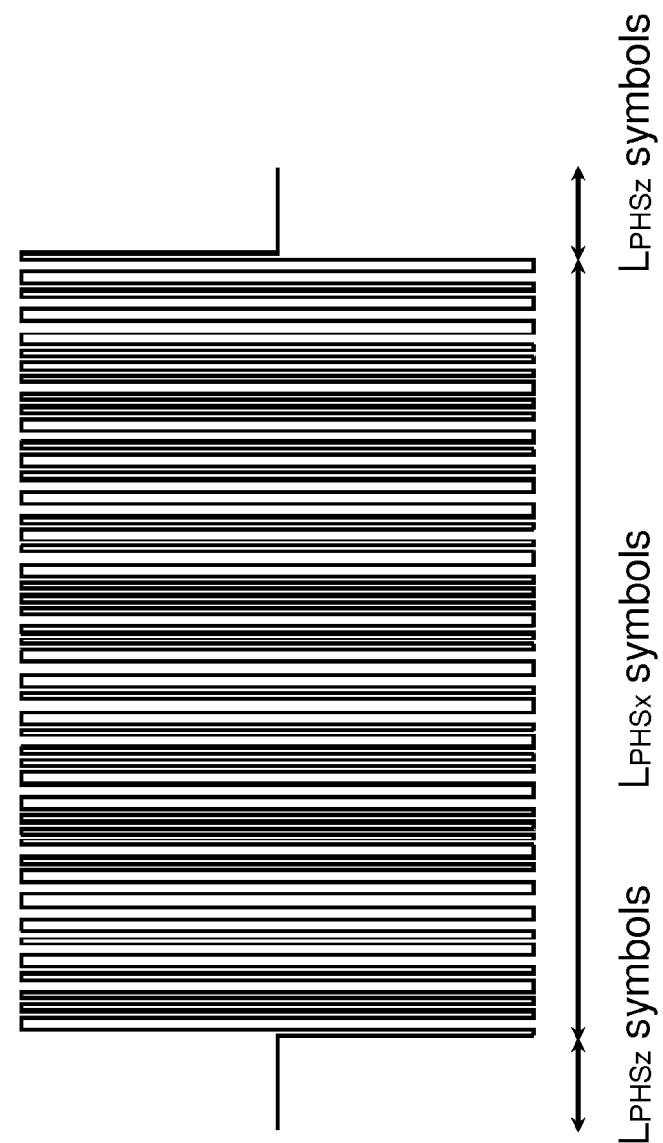
FIG. 17 is a schematic drawing illustrating a signal corresponding to the generated control data portion.

The power scaling is shown in FIG. 16B. An example of an output sequence after the power scaling is shown in FIG. 17. It is assumed that the physical header would be larger than the duration of, for instance, the synchronization sequence or the pilot sequence portion S1 and S2x. In order to avoid latency of the user data transmission, the physical header is therefore subdivided into several chunks (portions) denoted PHSx and transmitted in regular time intervals within the frame and in an alternate manner with the data and pilot sequence. Advantageously, the length of each physical header chunk PHSx is equal to the length of the synchronization sequence S1. Advantageously, the distance between the physical header chunks, the synchronization sequence and the pilot sequence chunks is equal, which enables the receiver to perform blind timing recovery based on all of them (PHSx, S1, S2x) since they represent a common time base. Preferably, the frequency of transmitting the physical header chunks is predefined and well known to both the receiver and the transmitter.

As can be seen from FIGS. 6 and 7, the physical header chunks may be located between two consecutive pilot sub-blocks so that the physical header information as well as the pilot estimation capability are uniformly spread along the frame. Similarly to the synchronization sequence S1 and the pilot sequence portions S2x, each physical header chunk PHSx is pre-pended and appended by zero sequence to avoid inter symbol interference. This can be seen in FIG. 17, in which the number $L_{PHSx}$ of symbols represent the pre-pended and appended zero signal.

The power scaling of the physical header corresponds to the power scaling defined by means of the power scaling parameter k0 and is equal to $2^{k0}-1$ used also for scaling of the synchronization sequence S1. Preferably, the length of the zero symbol sequences is the same as that in the above described synchronization sequence S1 and a pilot sequence portion S2x, preferably 16 symbols. The length of the 2-PAM symbol sequence composing the physical header is preferably 1792 symbols which are subdivided into physical header chunks, each having 128 symbols. The symbol rate $F_s$ is preferably 312.5 mega symbols per second and it is equal for the entire frame. This results in 14 physical header chunks PHSx within a frame.

The payload data subblocks are used to carry the user data information. The user data information is encoded and modulated in accordance with the capacity of the available communication channel.

It is advantageous to use block-oriented channel coding rather than convolutional codes, since this enables the reduction of the decoding latency. Moreover, the payload data subblocks can extend over an integer number of codewords so that the forward error correction decoding of each payload data subblock is independent. This is mainly advantageous when the low-power mode frame structure is used, because the decoding latency does not depend on the enabled data subblocks in the frame. In addition, the decoding latency does not present jitter, since the symbols belonging to a code-word are received without interruption.

FIGS. 5 and 7 illustrate a frame structure in which a payload subblock includes four slots which are at the same time four MLCC codewords (CW). The employment of the block coding has the advantage of alignment with the start of the subblock. This is particularly advantageous for the low power mode frame structure, since the decoding latency would otherwise be increased for the payload subblock, for instance when the codeword spaned over the subblock borders. The payload subblock length is selected in such a way that the overhead produced by the transmission of synchronizatioin sequence, pilots and physical header in the frame is relatively small.

The payload subblocks are not pre-pended or appended by zero sequences, since these sequences are already included in the synchronization sequence S1, the pilot sequence S2x and the physical header PHSx subblocks. The pre-pended and appended zero sequences before and after the synchronization, the pilot and the header subblocks are selected to have such a length that the channel impulse response, and in particular its substantial part is included.

The scaling factor applied to the payload subblocks depends on the number of levels M of the M-PAM modulation. The number of levels (order) of the modulation may depend on the adaptive configuration of the communication system which is advantageously selected to approach channel capacity. In particular, the M-PAM modulation takes values from the set:

$$\{-M+1, -M+3, \ldots, M-3, M-1\}$$

The scaling factor also depends on the Tomlinson-Harashima precoding, which is used in payload subblock transmission unlike the transmission of the physical header and pilot sequences. In the case of Tomlinson-Harashima precoding, at the beginning of each payload subblock, the state of feedback filter is reset. This means that it is assumed that all the previous symbols entering the Tomlinson-Harashima precoder were zero. This reset is employed since the subblocks with control information such as the synchronization sequence S1, the pilot sequence S2 and the physical header sequence PHS are not precoded.

The $2^{[k]}$PAM constellations being output from the MLC encoder are affected by a scale factor in order to obtain equal peak-to-peak amplitude for any constellation. The constellations are scaled for equal optical modulation amplitude (OMA) since the optical channel is a power peak limited communication channel, as explained in the Background Section.

For instance parameter k may be defined as k=1, 1.5, 2, . . . , 7.5, 8 bits per dimension and the scaling factor may be used when THP is used:

$$SF_{thp}(k) = -\lceil k \rceil \cdot 2^{k_0}$$

When LE or DFE are used, then $$SF_{full}(k) = \text{round}\left(\frac{2^{k_0} - 1}{2^{\lceil k \rceil} - 1}\right)$$

$$\text{round}(x) = \text{sgn}(x) \cdot \left\lfloor |x| + \frac{1}{2}\right\rfloor$$

wherein sgn is an operator returning a sign of the input expression. Here it is assumed that the constellations are normalized to the arbitrary range $[-2^{k_0}, 2^{k_0})$ after scaling.

As the constellations are not scaled for equal average energy, the signal to noise ratio available for each constellation depends on constant k and on precoding. In particular, the signal to noise ratio is higher for constellation with lower crest factor. In case of the Tomlinson-Harashima precoding implemented for payload subblocks, all constellations present the same crest factor after precoding and the available signal to noise ratio for each constellation depends on the precoding loss.

Figure 18B:
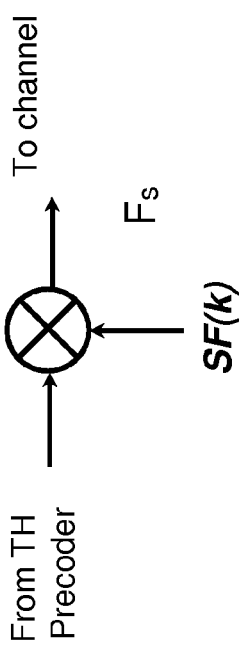
FIG. 18B is a block diagram illustrating an example of an implementation of power scaling after Tomlinson-Harashima precoding, in user data portions.

FIG. 18A shows an example of a table listing the parameter k and the corresponding scaling factor (SF) with Tomlinson-Harashima precoding enabled (third column) and disabled (fourth column), respectively, for different M-PAM order constellations. FIG. 18B shows the operation of power scaling performed at the encoder. In particular, from the Tomlinson-Harashima precoder, a signal enters the scaling unit and is scaled with the factor SF(k) and output at symbol rate $F_s$ to the channel.

Figure 19:
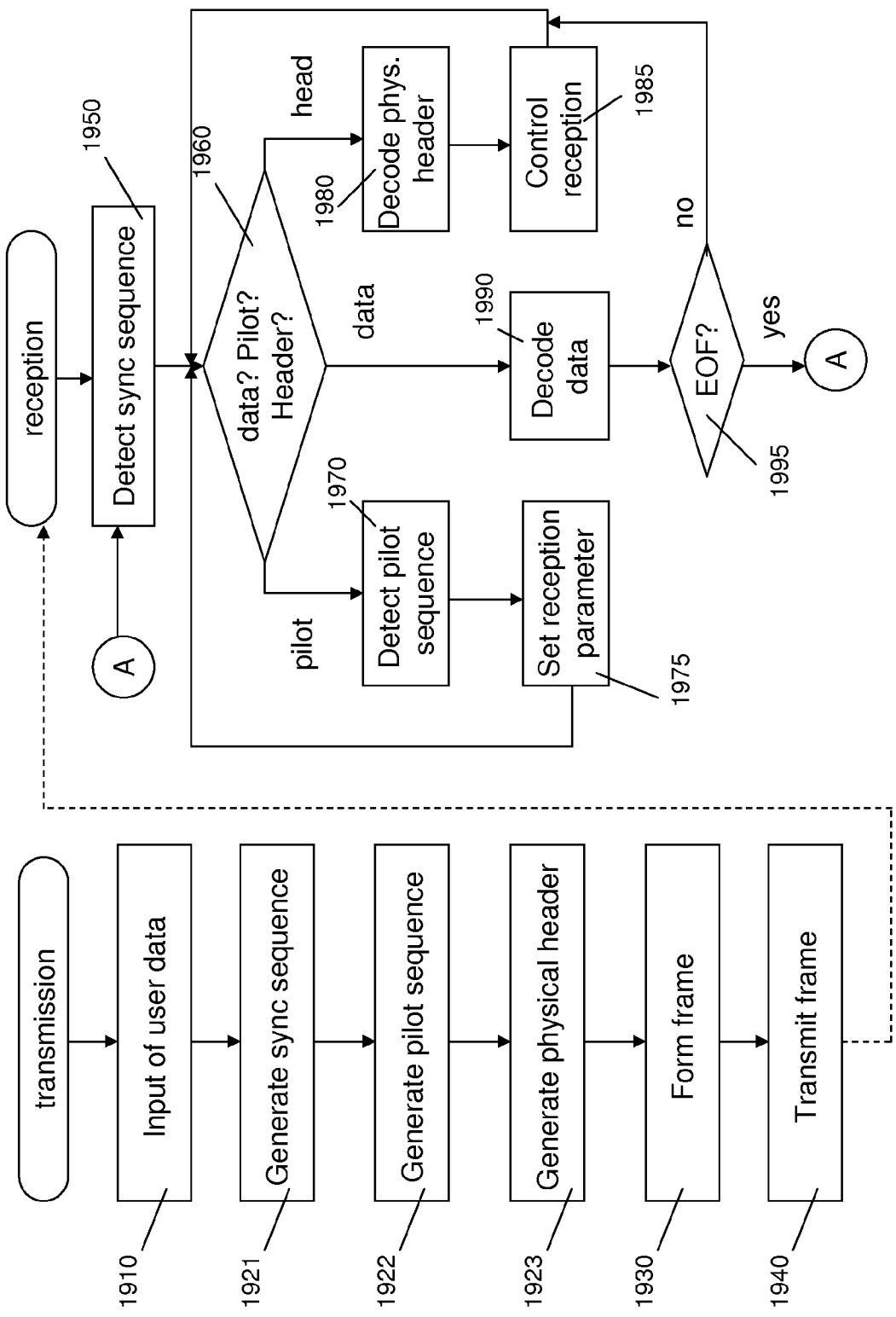
FIG. 19 is a flow diagram illustrating methods according to an embodiment of the present invention.

FIG. 19 illustrates an example of a transmitting and receiving method according to the present invention, of which a detailed example and embodiments have been provided above. In particular, the transmitting method may include the step of inputting 1910 (receiving) of user data. This step typically corresponds to receiving the user data from higher layers, encapsulated possibly in higher layer protocol(s). For instance, a video signal encoded with MPEG and encapsulated in IP packets and/or MAC layer packets may be input. However, any kind of media such as audio, text, multimedia, etc. encapsulated in any protocol stack may be input to the physical layer. Accordingly, here, the user data are the content data possibly compressed and encapsulated in one or more protocols.

At the transmitter side, these user data are segmented in order to be inserted into the frame structure. The frame starts with a synchronization sequence, which is generated in step 1921. The synchronization sequence is followed in the frame with a first user data portion (user data subblock). In the above examples the size of the user data portion was four codewords coded for instance by the MLCC and possibly precoded. The first portion of user data is then followed by either physical layer header portion or a reference signal portion. In the above examples, the physical header portion follows. The physical header portion PHS0 is preferably transmitted since this approach enables regular synchronization (timing determination, i.e. adjusting of the sampling point) based on the synchronization sequence and the pilot portions. However, this is only an example and, in general, the order may be reversed. The reference signal is generated in step 1922 and the physical layer header is generated in step 1923.

After inserting of each of the pilot sequence portion and the physical header portion, a portion of user data is inserted into the frame. It is noted that the control information input to the physical header is also generated based on the transmission parameters selected, for instance based on the feedback from the receiver (the control information here may be an information controlling the redundancy of the channel encoder, precoding, etc.). It may also include the link negotiation control protocol.

The frame is thus formed 1930 as described above, starting with the synchronization portion and including a predefined number of user data portions, reference signal portions and physical header portions ordered in compliance with the present invention. The frame formed is then transmitted 1940 over the plastic optical fibre.

An example of receiving method according to the present invention is shown on the right side of FIG. 19. In particular, a signal is received from the plastic optical fibre. The signal may be a signal as transmitted by the transmission method described above, which is indicated in the figure by a dashed line. The received signal is further processed. In particular, the borders of a frame are detected at first. The start of frame is detected 1950 by looking for the synchronization sequence. This may be performed by correlating the received signal with the a-priori known synchronization sequence. The result of the detection is the knowledge of the frame start. Moreover, in accordance with the symbols of the synchronization sequence, the symbol timing may be determined. In particular, the optimum timing for sampling (e.g. the middle of the symbol pulse) may be determined. After the synchronization sequence, in the frame structure, the user data portion is transmitted and, correspondingly, also received. Thus, the step 1960 leads to the step 1990 of decoding (and/or demodulating) the user data. This may be performed, for instance by applying a decoding as briefly described with reference to FIGS. 3C and 3A. However, the present application is not limited by that approach and, in general, any other decoding may be applied, depending on the coding applied to the data at the transmitter. For the purpose of the present invention the data may even be uncoded. In such a case step 1990 may include the demodulation. In step 1995 it is checked whether the end of the frame is reached. If the end of the frame (EDF) is reached, then the start of the new frame is detected as already described—in step 1950.

If the end of the frame is not reached, the data are followed, in general, by either physical header portion or by a reference signal portion, corresponding to branches "head" and "pilot" of the decision block 1960. The decision in step 1960 may be performed based on the fixed predefined frame structure. Accordingly, it is known, which type of symbols shall be processed as the next. For instance, the user data portion decoded as described above may be followed by a physical header portion. This physical header portion is then decoded 1980. The decoding 1980 of the physical header portion may comprise demodulating and/or decoding of the control data embedded in the physical header portion. The decoded control data are then used for controlling 1985 of the decoding of the user data of the following frames or portions of the same frame. This may include setting the parameters of the decoding and demodulation such as amount of redundancy added and/or precoding parameters. However, the present invention is not limited by these examples, and, in general, any information that needs to be signaled for appropriate processing of the user data may be received and processed to control the receiver, as well as to be transmitted to the link partner by using a return channel for, e.g. adaptive bit rate and/or Tomlinson-Harashima precoding coefficients. In case of the physical header is block coded and code-word is spread along one entire frame, the information that is able to carry the physical layer only affects the reception of the next frames, because reception of a complete frame is required for decoding.

After the decoding and processing the control information, the step 1960 shall lead to the branch of data decoding, since the physical header portion is to be followed by the user data portion. The user data portion is processed as already described above with reference to step 1990.

After the user data portion, the portion of the reference signal (reference symbols) is processed. This is indicated by the branch "pilot" from the step 1960. The pilot sequence is detected 1970 and the receiver parameters are set 1975 accordingly. For instance, the detection of the reference signal enables to refresh the time basis since the sequence is known at the receiver and may be correlated with the received signal similarly to the synchronization sequence. Moreover, the reference signals may be used to estimate channel conditions (i.e. linear and non-linear distortion estimation as well as equalizers adaptation) based on the received power of the reference symbol pulses and comparing it with the originally sent (to-be-sent) sequence. This knowledge may further be used to appropriately decode the user data (and/or the physical header).

The user data decoding 1990 is only performed in the normal power mode. However, for the low-power mode, this processing does not need to be performed since no data are received. In such a case, the decoding step 1990 is replaced with the step of switching off the reception and switching it on again after the time interval for receiving the user data. Correspondingly, for the low-power mode at the encoder side, the step 1910 of inputting the user data is not included.

It is noted that preferably, the structure of the frame is predefined, meaning that the ordering and position of the user data portions, physical header portions and reference signal portions within the frame are known to both receiver and transmitter and do not change in time. However, without departing from the scope of the present invention, there may be also embodiments in which the length of the frame, the length of user data blocks and/or other subblocks can be set dynamically.

Figure 20:
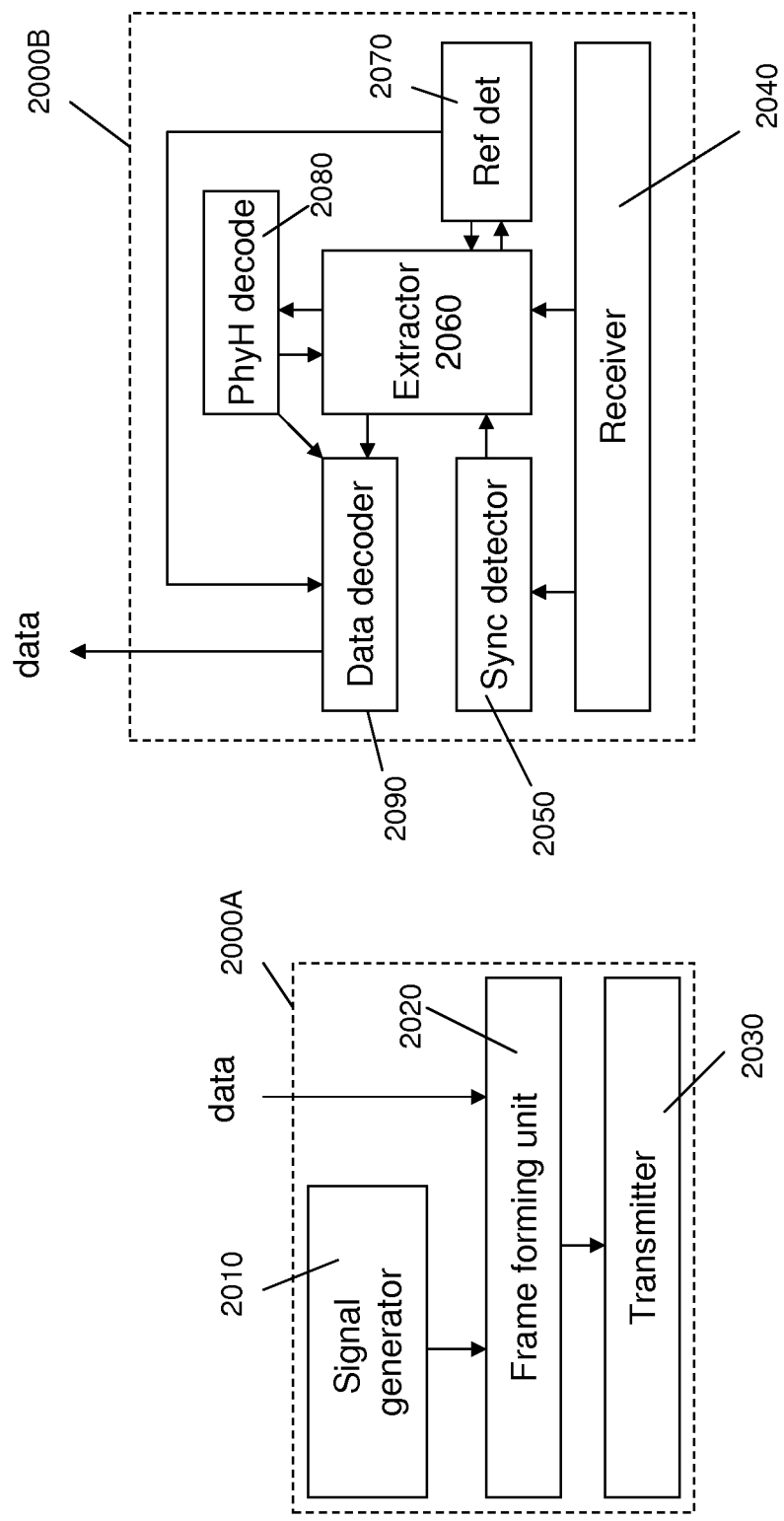
FIG. 20 is a block diagram illustrating apparatuses according to an embodiment of the present invention.

FIG. 20 exemplifies a functional structure of a transmitter and a receiver in accordance with the present invention. It is noted that the transmitter and receiver may in general include further functional blocks. FIG. 20 shows only a part of the device units which may be impacted by implementing the present invention and which are adapted in accordance with the present invention.

In particular, the encoder 2000a includes a signal generator 2010 for generating the additional signals to be transmitted in the frame together with the portions for transmitting the user data. In particular, the additional signals are the synchronization sequence, the physical header and the reference symbol sequence. The signal generator may thus include the corresponding separated portions: the synchronization sequence generator, the pilot sequence generator, and the header generator. The generated additional signals are then provided to the frame forming unit 2020. The frame forming unit 2020 forms the frame out of the additional signals and, if available, includes the user data. In particular, the frame starts with a synchronization sequence and then includes alternately the portions for transmitting the user data (which may, but do not necessarily actually include the user data) and the portions of the additional signal. The portions of the additional signal are the physical header portions and reference signal portions which are alternately included among the portions to transmit the user data. The so formed frame is transmitted by a transmitter 2030. The transmitter 2030 may include the pulse shaping and injecting the signal into the plastic optical fibre as illustrated in FIG. 1, blocks 110-130.

The POF receiver 2000b of FIG. 20 includes a receiving unit 2040, which may perform functions described with reference to FIG. 1, blocks 170-190. The receiver may further include a synchronization detecting unit 2050 for detecting the synchronization sequence. As described above, the synchronization detecting unit 2050 may include a correlator unit for performing the correlation of the received signal with the original synchronization sequence. The original synchronization sequence may be stored in the memory or generated on the fly in the same way as at the encoder, for instance by using an MLS generator as shown in FIG. 9. The output of the synchronization detector 2050 is the detected start of the frame and the sampling time basis. In accordance with the indicated start of the frame and the time basis, the extractor 2060 extracts from the frame further signals. For instance, reference signals are extracted and in the reference signal detector 2070, they are processed so as to estimate the channel conditions, adapt the timing base (which may be provided back to the extractor 2060) and adapt the equalizer parameters, and the estimated parameters may be provided to a data decoder 2090 for decoding the data which may also include the equalization. The extractor 2060 is also adapted to extract the physical header portions, which are then decoded in a physical header decoder 2080. The physical header decoder 2080 decodes the control information embedded in the physical header. This information, as described above, may then be provided to the data decoder 2090 for appropriately decoding the data (for instance, for correctly set the parameters of the decoder such as the bitrate including setting of the amount of recundancy, etc.).

It is noted that in general, both the synchronization sequence and the reference signal sequence include "pilot symbols" in the sense that these symbols are known at both the transmitter and the receiver. Accordingly, both of these signals (symbol sequences) may be used for determining the time basis (symbol sampling timing) and for determining the position within the frame. However, as described above, preferably, the synchronization sequence is transmitted with a high power (with the power range of the transmitter) and possibly only with two levels in order to ensure that the frame start is detected optimally and the receiver is able to implement the frame-start searching algorithm with low complexity. The pilots of the reference signal may include more modulation levels than the synchronization sequence, which is beneficial for finer estimation of the non linear POF channel. Preferably, the timing of both synchronization sequence and the reference signal sequence is same. Accordingly, the primary function of the synchronization sequence is the frame start detection. The primary function of the reference symbol sequence is channel estimation and equalizers adaptation. However, the synchronization sequence may also be used for a coarse channel estimation and the reference signal sequence may also be used for determining the position within the frame and its timing.

As described above, the present invention provides an efficient framing structure for the POF data transmission. In particular, the framing structure includes reference signal portions which serve for channel estimation and equalizer adaptation. The reference signal is spread along the frame in several portions in order to minimize the latency of the user data decoding and to keep at the same time the good convergence of adaptive algorithms. The framing structure further includes control data preferably coded by a block coding and spread by code-words along the frame in several portions. This enables to reduce the user data decoding latency while providing very robust control communication subchannel for signaling.

Summarizing, the present invention relates to transmission and reception of data over a plastic optical fibre. In particular, the present invention provides for transmission and reception over the plastic optical fibre a particularly suitable frame structure. The frame structure includes a synchronization sequence and portions of user data alternating with alternating reference signal portions and control data portions. The length of the user data portions may be equal, the length of the synchronization sequence and the control data and reference signal portions may also be equal. The distances between the synchronization sequence and the reference signal portions and the control data portions are advantageously equal. The alternating of data and additional information avoids data decoding latency while maintaining the rate necessary for the additional information.

The invention claimed is:

1. A method for transmitting user data over a plastic optical fibre including the steps of:
generating a synchronization sequence, a reference signal and a control signal;
forming a frame starting with the generated synchronization sequence and including a first plurality of portions for transmitting the user data, a second plurality of portions of the reference signal, and a third plurality of portions of the control data, wherein a portion of the first plurality of portions for transmitting the user data is located between any two of the generated synchronization sequence, a portion of the reference signal and a portion of the control data, and
transmitting the frame over a plastic optical fibre.

2. The method according to claim 1, wherein
a distance in terms of frame timing between any two of the synchronization sequence, a portion of the reference signal and a portion of the control data is equal, and/or
a length in terms of frame timing of the synchronization sequence, a portion of the reference signal and a portion of the control data is equal, and/or
between any two portions of the reference signal there is a portion of the control data.

3. The method according to claim 1, further comprising:
a step of low-power transmission or reception including respective transmitting or receiving substantially no power within the user data portions of the frame, and transmitting or receiving the synchronization sequence, the reference signal and the control information with a predetermined non-zero power.

4. The method according to claim 1, wherein
the synchronization sequence is a predefined sequence of symbols modulated by a 2-level pulse-amplitude modulation,
the synchronization sequence, each reference signal portion, and each control data portion starts and ends with a zero-signal of a predefined length, and
wherein Tomlinson-Harashima precoding is applied to the user data.

5. The method according to claim 1, wherein
the reference signal is a sequence of predetermined symbols modulated by an M-level pulse-amplitude modulation with M being an integer larger than 2.

6. The method according to claim 1, wherein
the control data is modulated by a 2-dimensional binary phase shift keying 2-level pulse-amplitude modulation, 2D BPSK 2-PAM, coded with a forward error correction coding and included a cyclic redundancy check, and
the signal carrying the user data, and/or control data and/or reference signal and/or synchronization signal are scaled so as to guarantee substantially equal peak-to-peak optical power in transmission.

7. A method for receiving user data over a plastic optical fibre including the steps of:
receiving a signal over a plastic optical fibre,
detecting in the received signal a synchronization sequence indicating a start of a frame;
extracting from the frame a plurality of portions of a reference signal and control data, wherein a portion for transmitting the user data is located between any two of the synchronization sequence, a portion of the reference signal and a portion of the control data.

8. An apparatus for transmitting user data over a plastic optical fibre including:
a generator for generating a synchronization sequence, a reference signal and a control signal;
a frame assembler for forming a frame, the frame starting with the generated synchronization sequence and including a first plurality of portions for transmitting the user data, a second plurality of portions of the reference signal, and a third plurality of portions of the control data, wherein a portion for transmitting the user data is located between any two of the synchronization sequence, a portion of the reference signal and a portion of the control data, and
a transmitter for transmitting the frame over a plastic optical fibre.

9. The apparatus according to claim 8, wherein
the distance in terms of frame timing between any two of the synchronization sequence, a portion of the reference signal and a portion of the control data is equal, and/or
the length in terms of frame timing of the synchronization sequence, a portion of the reference signal and a portion of the control data is equal, and/or
between any two portions of the reference signal there is a portion of the control data.

10. The apparatus according to claim 8, further comprising:
a low-power transmission/reception unit for low-power transmission or reception including respective transmitting or receiving substantially no power within the user data portions of the frame, and transmitting or receiving the synchronization sequence, the reference signal and the control information with a predetermined non-zero power.

11. The apparatus according to claim 8, wherein
the synchronization sequence is a predefined sequence of symbols modulated by a 2-level pulse-amplitude modulation, and
the synchronization sequence, each reference signal portion, and each control data portion starts and ends with a zero-signal of a predefined length, and
wherein Tomlinson-Harashima precoding is applied to the user data.

12. The apparatus according to claim 8, wherein
the reference signal is a sequence of predetermined symbols modulated by an M-level pulse-amplitude modulation with M being an integer larger than 2.

13. The apparatus according to claim 8, wherein
the control data is modulated by a 2-dimensional binary phase shift keying 2-level pulse-amplitude modulation, 2D BPSK 2-PAM, coded with a forward error correction coding and included a cyclic redundancy check, and
the signal carrying the user data, and/or control data and/or reference signal and/or synchronization signal are scaled so as to ensure substantially equal peak-to-peak optical power in transmission.

14. An apparatus for receiving user data over a plastic optical fibre, the apparatus including:
a receiver for receiving a signal over a plastic optical fibre,
a synchronizer for detecting in the received signal a synchronization sequence indicating a start of a frame;
a signal detector for extracting from the frame a plurality of portions of a reference signal, wherein a portion for receiving the user data is located between any two of the synchronization sequence, a portion of the reference signal and a portion of the control data.

15. The apparatus according to claim 14, wherein
the distance in terms of frame timing between each two of the synchronization sequence, a portion of the reference signal and a portion of the control data is equal, and/or
the length in terms of frame timing of the of the synchronization sequence, a portion of the reference signal and a portion of the control data is equal, and/or
between each two portions of the reference signal there is a portion of the control data.

16. The apparatus according to claim 14, further comprising:
a low-power transmission/reception unit for low-power transmission or reception including respective transmitting or receiving substantially no power within the user data portions of the frame, and transmitting or receiving the synchronization sequence, the reference signal and the control information with a predetermined non-zero power.

17. The apparatus according to claim 14, wherein
the synchronization sequence is a predefined sequence of symbols modulated by a 2-level pulse-amplitude modulation, and
the synchronization sequence, each reference signal portion, and each control data portion starts and ends with a zero-signal of a predefined length, and
wherein Tomlinson-Harashima precoding is applied to the user data.

18. The apparatus according to claim 14, wherein
the reference signal is a sequence of predetermined symbols modulated by an M-level pulse-amplitude modulation with M being an integer larger than 2.

19. The apparatus according to claim 14, wherein
the control data is modulated by a 2-dimensional binary phase shift keying 2-level pulse-amplitude modulation, 2D BPSK 2-PAM, coded with a forward error correction coding and included a cyclic redundancy check, and
the signal carrying the user data, and/or control data and/or reference signal and/or synchronization signal are scaled so as to ensure substantially equal peak-to-peak optical power in transmission.

20. An integrated circuit embodying the apparatus according to claim 8.

* * * * *